(12) United States Patent
Bishop et al.

(10) Patent No.: US 11,644,618 B2
(45) Date of Patent: May 9, 2023

(54) DISCRETE OPTICAL UNIT ON A SUBSTRATE OF AN INTEGRATED PHOTONICS CHIP

(71) Applicant: Apple Inc., Cupertino, CA (US)

(72) Inventors: Michael J. Bishop, San Carlos, CA (US); Vijay M. Iyer, Mammoth Lakes, CA (US); Lexie Nicole Schachne, Palo Alto, CA (US); Jason Pelc, Sunnyvale, CA (US)

(*) Notice: Subject to any disclaimer, the term of this patent is extended or adjusted under 35 U.S.C. 154(b) by 0 days.

(21) Appl. No.: 17/254,810

(22) PCT Filed: Jun. 21, 2019

(86) PCT No.: PCT/US2019/038599
§ 371 (c)(1),
(2) Date: Dec. 21, 2020

(87) PCT Pub. No.: WO2019/246594
PCT Pub. Date: Dec. 26, 2019

(65) Prior Publication Data
US 2021/0263216 A1 Aug. 26, 2021

Related U.S. Application Data
(60) Provisional application No. 62/689,018, filed on Jun. 22, 2018.

(51) Int. Cl.
*G02B 6/12* (2006.01)
*G02B 6/122* (2006.01)
*G02B 6/42* (2006.01)

(52) U.S. Cl.
CPC ......... *G02B 6/12004* (2013.01); *G02B 6/122* (2013.01); *G02B 6/4244* (2013.01);
(Continued)

(58) Field of Classification Search
CPC ............... G02B 6/12004; G02B 6/122; G02B 6/4244; G02B 2006/12104; G02B 2006/12138; G02B 6/4214; G02B 6/4257
See application file for complete search history.

(56) References Cited

U.S. PATENT DOCUMENTS 5,135,605 A 8/1992 Blonder
5,182,787 A 1/1993 Blonder
(Continued)

FOREIGN PATENT DOCUMENTS

EP 1403985 3/2004
EP 1432045 6/2004
(Continued)

OTHER PUBLICATIONS

Gonzalez-Sanchez et al., "Capacitive Sensing for Non-Invasive Breathing and Heart Monitoring in Non-Restrained, Non-Sedated Laboratory Mice," Sensors 2016, vol. 16, No. 1052, pp. 1-16.
(Continued)

*Primary Examiner* — John Bedtelyon
(74) *Attorney, Agent, or Firm* — Brownstein Hyatt Farber Schreck, LLP

(57) ABSTRACT

An integrated photonics device that emits light out towards a measured sample value is disclosed. The device can include a discrete optical unit that attaches to a supporting layer. The discrete optical unit can include mirror(s), optics, detector array(s), and traces. The supporting layer can include one or more cavities having facet walls. Light emitter(s) can emit light that propagate through waveguide(s). The emitted light can exit the waveguide(s) (via termination point(s)), enter the one or more cavities at the facet walls, and be received by receiving facets of the discrete optical unit. The mirror(s) of the discrete optical unit can redirect the received light towards collimating optics, which can direct the light out of the device through
(Continued)

the system interface. The discrete optical unit can be formed separately from the supporting layer or bonded to the supporting layer after the mirror, optics, detector arrays, and traces are formed.

22 Claims, 19 Drawing Sheets

(52) U.S. Cl.
CPC .............. *G02B 2006/12104* (2013.01); *G02B 2006/12138* (2013.01)

(56) References Cited

U.S. PATENT DOCUMENTS

| | | |
|---|---|---|
| 5,287,376 A | 2/1994 | Paoli |
| 5,488,678 A | 1/1996 | Taneya |
| 5,644,667 A | 7/1997 | Tabuchi |
| 5,742,631 A | 4/1998 | Paoli |
| 6,112,005 A | 8/2000 | Liu |
| 6,122,042 A | 9/2000 | Wunderman et al. |
| 6,330,378 B1 | 12/2001 | Forrest |
| 6,393,185 B1 | 5/2002 | Deacon et al. |
| 6,594,409 B2 | 7/2003 | Dutt et al. |
| 6,628,686 B1 | 9/2003 | Sargent |
| 6,657,723 B2 | 12/2003 | Cohen |
| 6,795,622 B2 | 9/2004 | Forrest |
| 6,892,449 B1 | 5/2005 | Brophy et al. |
| 6,940,182 B2 | 9/2005 | Hilton et al. |
| 6,947,639 B2 | 9/2005 | Singh |
| 6,952,504 B2 | 10/2005 | Bi |
| 6,987,906 B2 * | 1/2006 | Nakama ................... G02B 6/42 385/15 |
| 7,054,517 B2 | 5/2006 | Mossberg |
| 7,058,245 B2 | 6/2006 | Farahi |
| 7,079,715 B2 | 7/2006 | Kish |
| 7,203,401 B2 | 4/2007 | Mossberg |
| 7,203,426 B2 | 4/2007 | Wu et al. |
| 7,209,611 B2 | 4/2007 | Joyner |
| 7,245,379 B2 | 7/2007 | Schwabe |
| 7,250,317 B2 | 7/2007 | Heideman |
| 7,283,694 B2 | 10/2007 | Welch |
| 7,314,451 B2 | 1/2008 | Halperin et al. |
| 7,324,195 B2 | 1/2008 | Packirisamy et al. |
| 7,366,364 B2 | 4/2008 | Singh |
| 7,447,393 B2 | 11/2008 | Yan |
| 7,460,742 B2 | 12/2008 | Joyner |
| 7,477,384 B2 | 1/2009 | Schwabe |
| 7,483,599 B2 | 1/2009 | Dominic et al. |
| 7,526,007 B2 | 4/2009 | Chua et al. |
| 7,558,301 B2 | 7/2009 | Lin et al. |
| 7,680,364 B2 | 3/2010 | Nilsson |
| 7,720,328 B2 | 5/2010 | Yan |
| 7,885,302 B2 | 2/2011 | Eberhard |
| 7,885,492 B2 | 2/2011 | Welch |
| 7,974,504 B2 | 7/2011 | Nagarajan |
| 7,995,875 B2 | 8/2011 | Yasuda et al. |
| 8,041,159 B2 | 10/2011 | Yanagisawa |
| 8,236,481 B2 | 8/2012 | Nottola et al. |
| 8,300,994 B2 | 10/2012 | Welch et al. |
| 8,559,775 B2 | 10/2013 | Babie et al. |
| 8,564,784 B2 | 10/2013 | Wang et al. |
| 8,724,100 B1 | 5/2014 | Asghari et al. |
| 8,774,575 B2 | 7/2014 | Fujiwara et al. |
| 8,920,332 B2 | 12/2014 | Hong et al. |
| 8,983,250 B2 | 3/2015 | Black et al. |
| 9,020,004 B2 | 4/2015 | Jeong |
| 9,025,926 B2 | 5/2015 | Chang et al. |
| 9,031,412 B2 | 5/2015 | Nagarajan |
| 9,110,259 B1 | 8/2015 | Black |
| 9,135,397 B2 | 9/2015 | Denyer et al. |
| 9,176,282 B2 | 11/2015 | Pottier |
| 9,182,544 B2 | 11/2015 | Kobrinsky et al. |
| 9,217,669 B2 | 12/2015 | Wu et al. |
| 9,229,179 B2 | 1/2016 | Ishibashi |
| 9,285,555 B2 | 3/2016 | Yabre |
| 9,348,154 B2 | 5/2016 | Hayakawa |
| 9,370,689 B2 | 6/2016 | Guillama et al. |
| 9,377,594 B2 | 6/2016 | Lift et al. |
| 9,405,066 B2 | 8/2016 | Mahgerefteh |
| 9,470,864 B1 | 10/2016 | Yo |
| 9,507,086 B2 | 11/2016 | Kobrinsky et al. |
| 9,543,736 B1 | 1/2017 | Barwicz et al. |
| 9,568,679 B2 | 2/2017 | Doany et al. |
| 9,620,931 B2 | 4/2017 | Tanaka |
| 9,696,486 B2 | 7/2017 | Zheng |
| 9,705,289 B2 | 7/2017 | Kanskar et al. |
| 9,766,370 B2 | 9/2017 | Aloe et al. |
| 9,804,027 B2 | 10/2017 | Fish et al. |
| 9,829,631 B2 | 11/2017 | Lambert |
| 9,880,352 B2 | 1/2018 | Florjanczyk |
| 9,943,237 B2 | 4/2018 | Baker et al. |
| 9,948,063 B2 | 4/2018 | Caneau et al. |
| 10,009,668 B2 | 6/2018 | Liboiron-Ladouceur |
| 10,018,781 B1 | 7/2018 | Masuda |
| 10,025,044 B1 | 7/2018 | Masuda |
| 10,132,996 B2 | 11/2018 | Lambert |
| 10,209,452 B1 | 2/2019 | Hung et al. |
| 10,238,351 B2 | 3/2019 | Halperin et al. |
| 10,285,898 B2 | 5/2019 | Douglas et al. |
| 10,310,196 B2 | 6/2019 | Hutchison |
| 10,379,293 B2 | 8/2019 | Nakazuru et al. |
| 10,429,597 B2 | 10/2019 | Ten Have et al. |
| 10,529,003 B2 | 1/2020 | Mazed |
| 10,539,752 B2 | 1/2020 | Masuda |
| 10,558,003 B2 | 2/2020 | Ootorii |
| 10,613,282 B2 | 4/2020 | Cyr |
| 10,634,843 B2 | 4/2020 | Bayn et al. |
| 10,650,110 B2 | 5/2020 | Van Vaerenbergh et al. |
| 10,687,718 B2 | 6/2020 | Allec et al. |
| 10,725,242 B2 | 7/2020 | Beausoleil et al. |
| 10,823,912 B1 | 11/2020 | Pelc et al. |
| 10,852,492 B1 | 12/2020 | Vermeulen et al. |
| 2005/0053112 A1 | 3/2005 | Shams-Zadeh-Amiri |
| 2005/0063431 A1 | 3/2005 | Gallup et al. |
| 2006/0002443 A1 | 1/2006 | Farber et al. |
| 2008/0044128 A1 | 2/2008 | Kish et al. |
| 2008/0310470 A1 | 12/2008 | Ooi et al. |
| 2014/0029943 A1 | 1/2014 | Mathai et al. |
| 2014/0086527 A1 | 3/2014 | Ban et al. |
| 2016/0224750 A1 | 8/2016 | Kethman et al. |
| 2017/0164878 A1 | 6/2017 | Connor |
| 2019/0339468 A1 | 11/2019 | Evans |
| 2019/0342009 A1 | 11/2019 | Evans |
| 2020/0084050 A1 | 3/2020 | Mensch et al. |
| 2020/0152615 A1 | 5/2020 | Krasulick et al. |
| 2020/0244045 A1 | 7/2020 | Bismuto et al. |
| 2020/0253547 A1 | 8/2020 | Harris et al. |
| 2020/0309593 A1 | 10/2020 | Bismuto et al. |
| 2021/0033805 A1 | 2/2021 | Bishop et al. |
| 2022/0128782 A1 | 4/2022 | Goldis |

FOREIGN PATENT DOCUMENTS

| | | |
|---|---|---|
| JP | 2008089879 | 4/2008 |
| JP | 2008262116 | 10/2008 |
| WO | WO 01/014929 | 3/2001 |
| WO | WO 04/034831 | 4/2004 |
| WO | WO 05/091036 | 9/2005 |
| WO | WO 11/090274 | 7/2011 |
| WO | WO 17/040431 | 3/2017 |
| WO | WO 17/184420 | 10/2017 |
| WO | WO 17/184423 | 10/2017 |
| WO | WO 19/152990 | 8/2019 |
| WO | WO 20/106974 | 5/2020 |

OTHER PUBLICATIONS

Kybartas et al., "Capacitive Sensor for Respiratory Monitoring," Conference "Biomedical Engineering," Nov. 2015, 6 pages.
Lapedus, "Electroplating IC Packages—Tooling challenges increase as advanced packaging ramps up," *Semiconductor Engineering*,

(56) References Cited

OTHER PUBLICATIONS https://semiengineering.com/electroplating-ic-packages, Apr. 10, 2017, 22 pages.

Materials and Processes for Electronic Applications, Series Editor: James J. Licari, AvanTeco, Whittier, California, Elsevier Inc., 2009, 20 pages.

Worhoff et al., "Flip-chip assembly for photonic circuits," MESA+ Research Institute, University of Twente, Integrated Optical MicroSystems Group, The Netherlands, 12 pages.

International Search Report and Written Opinion dated Nov. 9, 2019, PCT/US2019/038599, 10 pages.

He et al., "Integrated Polarization Compensator for WDM Waveguide Demultiplexers," *IEEE Photonics Technology Letters* vol. 11, No. 2, Feb. 1999, pp. 224-226.

Sauer et al., "Individualized FAC on Bottom Tab subassemblies to minimize adhesive gap between emitter and optics," *High-Power Diode Laser Technology XV*, edited by Mark S. Zediker, Proceeding of SPIE, vol. 10086, 2017, 8 pages.

\* cited by examiner

DISCRETE OPTICAL UNIT ON A SUBSTRATE OF AN INTEGRATED PHOTONICS CHIP

CROSS REFERENCE OF RELATED APPLICATIONS

This application is a national stage application under 35 U.S.C. § 371 of PCT/US2019/038599, filed Jun. 21, 2019, which claims the benefit under 35 U.S.C. § 119(e) of U.S. Provisional Patent Application No. 62/689,018, filed on Jun. 22, 2018, the contents of which are incorporated herein by reference as if fully disclosed herein.

FIELD

This disclosure relates generally to an integrated photonics device configured for measuring one or more properties of a sample volume. More specifically, the integrated photonics device can include a discrete optical unit formed on a substrate.

BACKGROUND

Optical sensing systems can be used for a number of applications, one can be to measure one or more properties of a sample volume. The optical sensing system can include an integrated photonics device comprising a plurality of optical components such as light sources and detectors. In some instances, the integrated photonics device can be arranged such that light emitted from the light sources can propagate through a waveguide in one plane (e.g., x-y plane) and can be redirected to another plane (e.g., y-z plane) by a mirror (e.g., outcoupler). The mirror can have an angled wall to redirect incident light, where the angled wall can be formed by etching one or more layers, such as a waveguide. In some instances, the one or more layers may have one or more crystallographic planes, so etching may lead to a limited number of possibilities for angles.

The etching may also limit the height of the mirror, which may limit the area of its reflecting surface. The optical sensing system can have a light beam that exits a termination point of a waveguide, which may diverge starting at the termination point. The divergence of the light beam can cause a change in its size, shape, and/or symmetry relative to the termination point. This divergence may lead to an incident light beam having a size that is greater than and/or a centroid that is offset from the reflecting surface of the mirror. When the reflecting surface of the mirror is smaller than the size of the incident light beam and/or its centroid is offset from the centroid of the light beam, a portion of the incident light may be lost and/or may include one or more undesirable properties (e.g., spectral ripples, high efficiency loss, stray light issues).

The amount of beam divergence may differ depending on the wavelength(s) of the emitted light. Since some wavelengths may have a greater divergence angle than others, the beam properties (e.g., light loss and control) may be spectrally-dependent. A discrete optical unit suitable for an integrated photonics device that can account for the effects from beam divergence and fully capture the light beam may be desired.

SUMMARY

Described herein is an integrated photonics device used for emitting light out of a device towards a measured sample volume, where a portion of the emitted light can be returned and measured for determining one or more properties of the measured sample volume. The integrated photonics device can include a discrete optical unit that attaches to a supporting layer. The discrete optical unit can include one or more of mirror(s), optics, detector array(s), and traces. The supporting layer can include one or more cavities having facet walls. One or more light emitters can emit light that propagates through one or more waveguides. The emitted light can exit the waveguide(s) (via termination point(s)), enter the one or more cavities at the facet walls, and be received by receiving facets of the discrete optical unit. The mirror(s) of the discrete optical unit can redirect the received light towards collimating optics. The collimating optics can direct the light out of the device through the system interface.

The discrete optical unit can be formed separately from the supporting layer and bonded to the supporting layer after one or more of the mirror, optics, detector arrays, and traces are formed in its substrate. In this manner, the reflecting surface(s) of the mirror(s) may be sized and located to reduce loss of light and its control. In some examples, a fill material can be deposited between the facet wall of the cavity and the discrete optical unit to change the amount of divergence of the emitted light beam. Examples of the disclosure further include forming one or more overhangs in the discrete optical unit to reduce light loss.

DETAILED DESCRIPTION

Figure 1A:
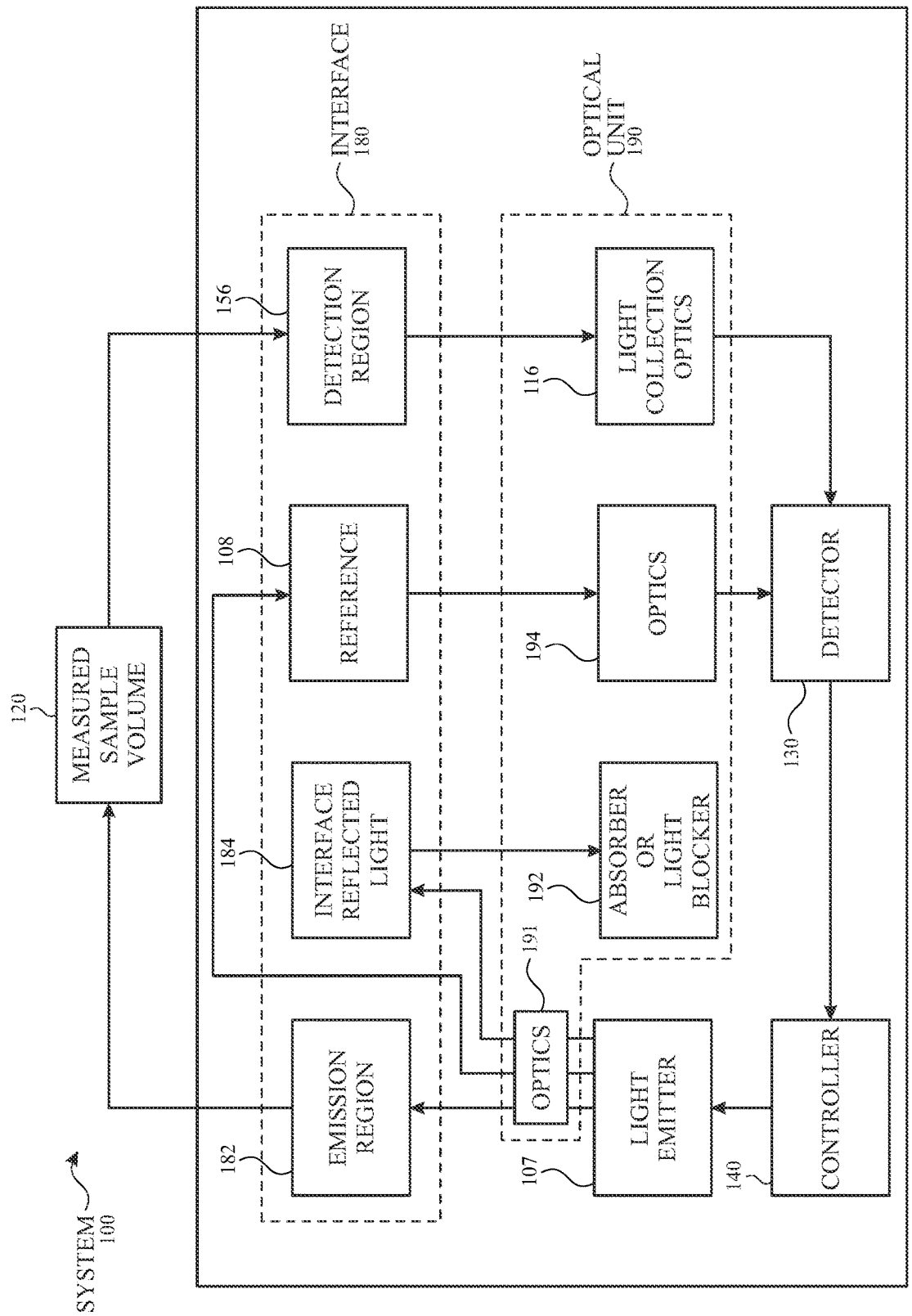
FIG. 1A illustrates a block diagram of an exemplary optical sensing system according to examples of the disclosure.

Optical sensing systems can be used for a number of applications, one can be to measure one or more properties of a sample volume. The optical sensing system can include an integrated photonics device comprising a plurality of optical components such as light sources and detectors. In some instances, the integrated photonics device can be arranged such that light emitted from the light sources can propagate through a waveguide in one plane (e.g., x-y plane) and can be redirected to another plane (e.g., y-z plane) by a mirror (e.g., outcoupler). The mirror can have an angled wall to redirect incident light, where the angled wall can be formed by etching one or more layers, such as a waveguide. In some instances, the one or more layers may have one or more crystallographic planes, so etching may lead to a limited number of possibilities for angles.

The etching may also limit the height of the mirror, which may limit the area of its reflecting surface. The optical sensing system can have a light beam that exits a termination point of a waveguide, which may diverge starting at the termination point. The divergence of the light beam can cause a change in its size, shape, and/or symmetry relative to the termination point. This divergence may lead to an incident light beam having a size that is greater than and/or a centroid that is offset from the reflecting surface of the mirror. When the reflecting surface of the mirror is smaller than the size of the incident light beam and/or its centroid is offset from the centroid of the light beam, a portion of the incident light may be lost and/or may include one or more undesirable properties (e.g., spectral ripples).

The amount of beam divergence may differ depending on the wavelength(s) of the emitted light. Since some wavelengths may have a greater divergence angle than others, the beam properties (e.g., light loss and control) may be spectrally-dependent. A discrete optical unit suitable for an integrated photonics device that can account for the effects from beam divergence and fully capture the light beam may be desired.

In the following description of examples, reference is made to the accompanying drawings in which it is shown by way of illustration specific examples that can be practiced. It is to be understood that other examples can be used and structural changes can be made without departing from the scope of the various examples.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order to not obscure some of the aspects and/or features described or referenced herein.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its description in a drawing does not imply that the illustrated process is exclusive of other variations and modification thereto, does not imply that the illustrated process or any of its steps are necessary to one or more of the examples, and does not imply that the illustrated process is preferred.

Described herein is an integrated photonics device used for emitting light out of a device towards a measured sample value, where a portion of the emitted light can be returned and measured for determining one or more properties of the measured sample volume. The integrated photonics device can include a discrete optical unit that attaches to a supporting layer. The discrete optical unit can include one or more of mirror(s), optics, detector array(s), and traces. The supporting layer can include one or more cavities having facet walls. One or more light emitters can emit light that propagates through one or more waveguides. The emitted light can exit the waveguide(s) (via termination point(s)), enter the one or more cavities at the facet walls, and be received by receiving facets of the discrete optical unit. The mirror(s) of the discrete optical unit can redirect the received light towards collimating optics. The collimating optics can direct the light out of the device through the system interface.

The discrete optical unit can be formed separately from the supporting layer and bonded to the supporting layer after one or more of the mirror, optics, detector arrays, and traces are formed in its substrate. In this manner, the reflecting surface(s) of the mirror(s) may be sized and located to reduce loss of light and its control. In some examples, a fill material can be deposited between the facet wall of the cavity and the discrete optical unit to change the amount of divergence of the emitted light beam. Examples of the disclosure further include forming one or more overhangs in the discrete optical unit to reduce light loss.

Representative applications of methods and apparatus according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

Figure 1B:
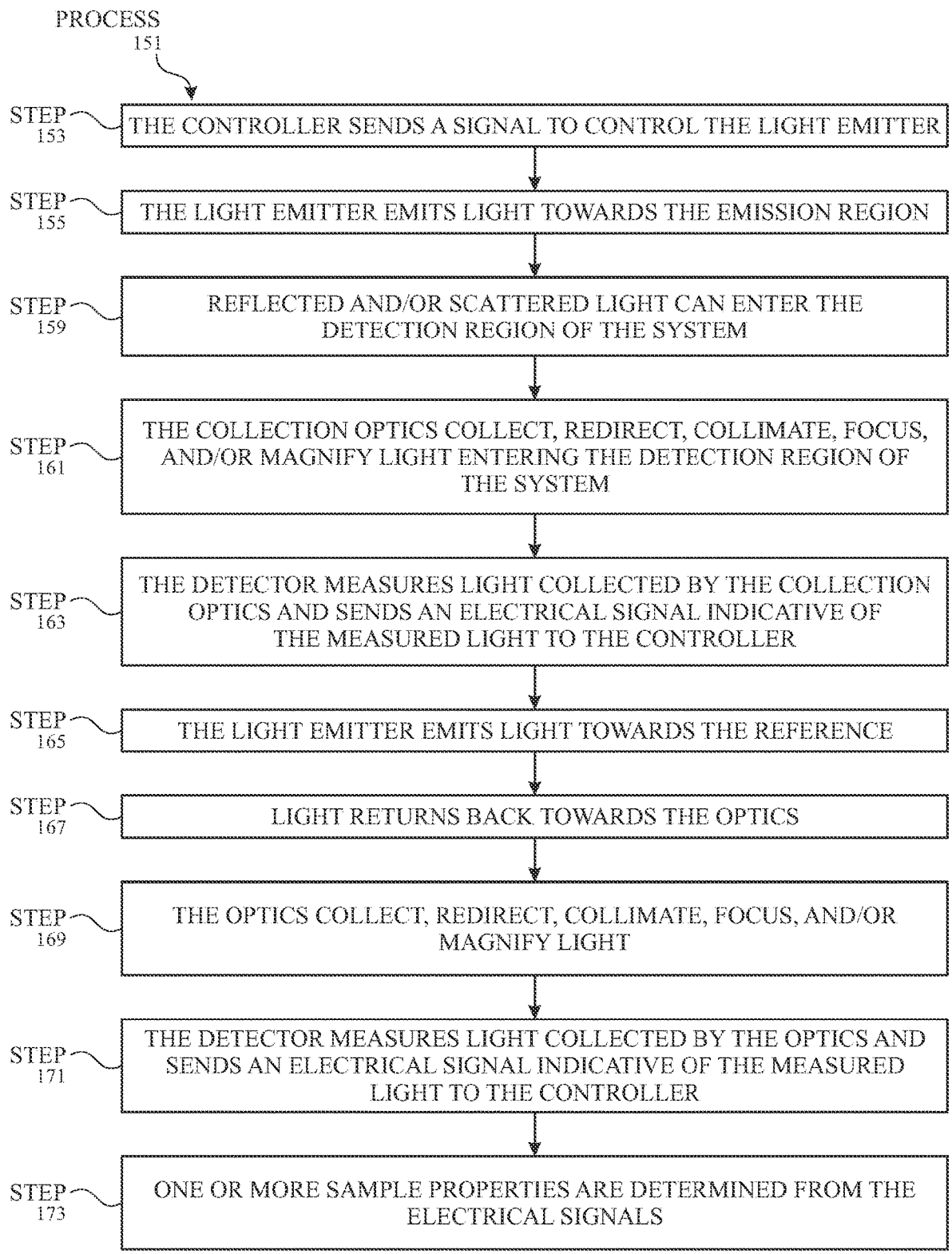
FIG. 1B illustrates an exemplary process flow for measuring sample properties according to examples of the disclosure.

An overview of the components included in an exemplary integrated photonics device and operation thereof are now described, with detailed descriptions provided below. FIG. 1A illustrates a block diagram of an exemplary optical sensing system according to examples of the disclosure. FIG. 1B illustrates an exemplary process flow for measuring sample properties according to examples of the disclosure. The system 100 can include an interface 180 (e.g., a system interface), an optical unit 190, a light emitter 107, a detector 130, and a controller 140. The system 100 can include an integrated photonics device, and the interface 180 can include an external surface of the device, which can accommodate light transmission through it, among other things. The interface 180 can include an emission region 182, a reference 108 (optional), and a detection region 156. In some examples, the emission region 182 can include one or more components (e.g., an aperture layer) configured to limit the optical path lengths and/or angles of light entering the system 100. By limiting the optical path lengths and/or angles of light, the light incident on, or exiting from, a measured sample volume 120 can also be limited. Optical unit 190 can include an absorber or light blocker 192, optics 191 (e.g., lenses), optics 194 (e.g., a negative microlens), and light collection optics 116 (e.g., a positive microlens). In using the system, the measured sample volume 120 can be located near, close to, or touching at least a portion (e.g., interface 180) of the system 100. The light emitter 107 can be coupled to the controller 140. The controller 140 can send a signal (e.g., current or voltage waveform) to control the light emitter 107, which can emit light (step 153 of process 150). The light emitter 107 can include a plurality of waveguides, in some examples. The light emitter 107 can emit light towards the emission region 182 (step 155 of process 151).

The emission region 182 can be configured to allow light to exit the system 100 towards the measured sample volume 120. Depending on the nature of the measured sample volume 120, light can penetrate a certain depth into the measured sample volume 120 to reach one or more scattering sites and can return (e.g., reflect and/or scatter back) towards the system 100. The return light can enter back into the system 100 at the detection region 156 (step 159 of process 151). The return light that enters back into the system can be collected by light collection optics 116, which can direct, collimate, focus, and/or magnify the return light (step 161 of process 151). The return light can be directed towards the detector 130 (e.g., a detector array). The detector 130 can detect the return light and send an electrical signal indicative of the amount of detected light to the controller 140 (step 163 of process 151).

The light emitter 107 can optionally emit light towards the reference 108 (step 165 of process 151). The reference 108 can redirect light towards optics 194 (step 167 of process 151). The reference 108 can include, but is not limited to, a mirror, a filter, and/or a sample with known optical properties. Optics 194 can direct, collimate, focus, and/or magnify light towards the detector 130 (step 169 of process 151). The detector 130 can measure light reflected from the reference 108 and can generate an electrical signal indicative of this reflected light (step 171 of process 151). The controller can be configured to receive at least two electrical signals from the detector 130. In some instances, one electrical signal can be indicative of return light from the measured sample volume 120, and another electrical signal can be indicative of light reflected from the reference 108. The different electrical signals can be a time-multiplexed signal, for example. The electrical signal at a given instance in time can be based on whether light is sent to the measured sample volume or the reference. In other instances, the two or more electrical signals can be received from different detector pixels simultaneously and may include different light information. The controller 140 (or another processor) can determine the properties of the sample from the electrical signals (step 173 of process 151).

In some examples, when the system is measuring the properties of the sample and the reference, light emitted from the light emitter 107 can reflect off a surface of the sample back into the system 100. Light reflected off the interior walls or components can be referred to as the interface reflected light 184. In some examples, the interface reflected light 184 could be light emitted from the light emitter 107 that has not reflected off the measured sample volume 120 or the reference 108 and can be due to light scattering within the system 100. Since the interface reflected light 184 can be unwanted, the absorber or light blocker 192 can prevent the interface reflected light 184 from being collected by optics 194 and light collection optics 116. In this manner, the system can prevent the interface reflected light 184 from being measured by the detector 130.

Arrangement of a Portion of an Exemplary Integrated Photonics Device

Figure 2A:
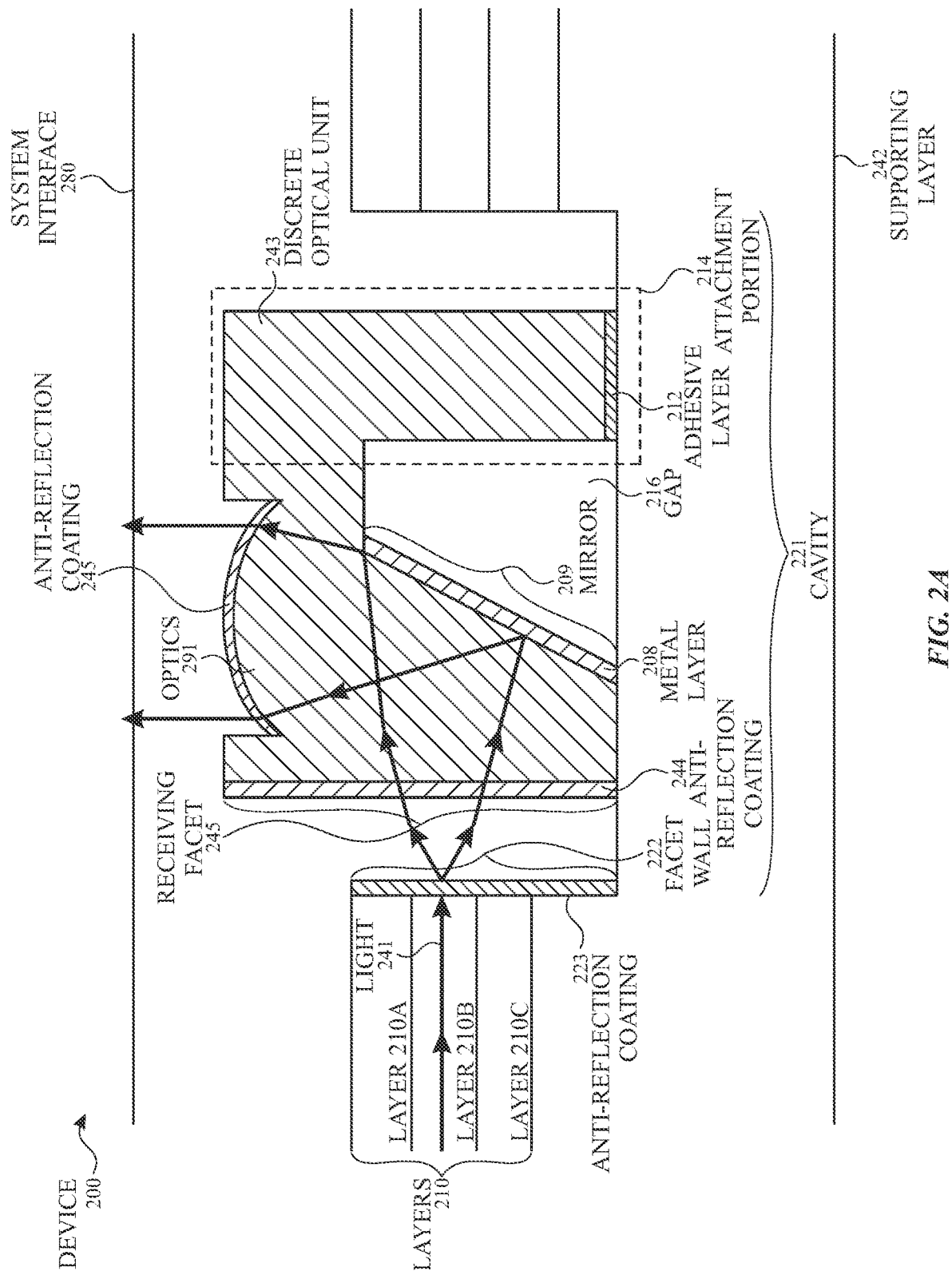
FIG. 2A illustrates a cross-sectional view of an exemplary portion of an integrated photonics device according to examples of the disclosure.

A description of a portion of an exemplary integrated photonics device is now provided. FIG. 2A illustrates a cross-sectional view of an exemplary portion of an integrated photonics device according to examples of the disclosure. In using the device 200, the measured sample volume (e.g., measured sample volume 120 illustrated in FIG. 1A) can be located close to the system interface 280. The device can include one or more windows (not shown) located at or proximate to the system interface 280. The window(s) can include one or more transparent and thermally conductive materials such as sapphire, silicon, or a combination thereof.

The measured sample volume can include one or more locations, which can include one or more scattering sites associated with scattering event(s). The device 200 can be configured to reconstruct the optical paths in the measured sample volume. For example, the device 200 can be configured to reconstruct angles and locations of light received at the detection regions (e.g., detection regions 156 illustrated in FIG. 1A) to another place (e.g., a plane located closer to the detector 130 illustrated in FIG. 1A). One or more layers of optics including optics 291 (discussed below) can be included in the device 200 and used for reconstructing the optical paths.

The device 200 can include multiple components, where the multiple components can be formed on, attached to, touching, or coupled to (e.g., indirectly associated with) a wafer, the wafer can include a supporting layer 242. The supporting layer 242 can include any type of material such as silicon. At least some of the multiple components can include optical components. Exemplary optical components can include a light emitter (e.g., light emitter 107 illustrated in FIG. 1A), a detector array (e.g., detector 130 illustrated in FIG. 1A), receiving optics (e.g., optics 194 illustrated in FIG. 1A), collecting optics (e.g., light collection optics 116 illustrated in FIG. 1A), and one or more discrete optical units 243. Other components (not shown) can include optical traces, multiplexers, amplifiers, and the like.

The supporting layer 242 and/or one or more layers 210 can include one or more cavities 221 at one or more locations along the wafer. The cavity 221 can include one or more components within its recess (discussed below). The walls of the cavity 221, which can include a facet wall 222, can define the recess of the cavity. Exemplary components can include, but are not limited to, at least a portion of the discrete optical unit 243, adhesive layer 212, fill material, and the like. The cavity 221 can be formed by removing (e.g., etching) material from the supporting layer 242 and/or one or more layers 210. In some examples, the cavity 221 can be formed by selectively depositing one or more of the layers 210 at a limited number of locations along the wafer of the device 200. In some instances, the facet wall 222 of the cavity can include an anti-reflection coating 223.

The adhesive layer 212 can be any type of material that allows the discrete optical unit 243 to bond to the supporting layer 242. Exemplary materials can include, but are not limited to, glue (e.g., thermal epoxy) and solder (e.g., gold, tin, etc.). In instances where solder is used, the adhesive layer 212 can including a plated material, such as nickel and/or gold, deposited on the supporting layer 242. Additionally or alternatively, the adhesive layer 212 can also include a patterned solder, such as gold tin, deposited on the discrete optical unit 243.

The device 200 can include a system interface 280. The system interface 280 can include one or more emission regions (e.g., emission region 182 illustrated in FIG. 1A) and one or more detection regions (e.g., detection region 156 illustrated in FIG. 1A). The emission region(s) can be configured to allow light 241 emitted by the light emitter, redirected by the mirror 209 (included in the discrete optical unit 243), and collected by optics 291 to exit the device 200 at the system interface 280. The detection region(s) (e.g., detection region 156 illustrated in FIG. 1A) can be configured to allow return light to enter the device 200 to be redirected by the collecting optics (e.g., light collection optics 116 illustrated in FIG. 1A) and detected by the detector array (e.g., detector 130 illustrated in FIG. 1.A). In some examples, certain detector pixels included in the detector array can be associated with different optical path lengths to determine (e.g., estimate) the optical properties (e.g., absorbance) of the measured sample volume.

The device 200 can include one or more light emitters (e.g., light emitter 107 illustrated in FIG. 1A). A light emitter can be configured to emit light 241. The light emitter can include any type of light source and one or more waveguides capable of generating and transmitting light 241 to the discrete optical unit 243, which can be located at least partially in the cavity 221. In some instances, the light emitter can include a single light source. In other instances, the light emitter can include a plurality of discrete light sources. A light source can include, but is not limited to, a lamp, laser, light-emitting diode (LED), organic light-emitting diode (OLED), electroluminescent (EL) source, quantum dot (QD) light emitter, super-luminescent diode, super-continuum source, fiber-based source, or a combination of one or more of these sources. In some examples, the light emitter can be capable of emitting a single wavelength of light. In some examples, the light emitter can be capable of emitting a plurality of wavelengths of light. In some examples, the light emitter can include any tunable source capable of generating a short-wave infrared (SWIR) signature. In some examples, a light emitter can include a III-V material, such as Indium Phosphide (InP), Gallium Antimonide (GaSb), Gallium Arsenide Antimonide (GaAsSb), Aluminum Arsenide (AlAs), Aluminum Gallium Arsenide (AlGaAs), Aluminum Iridium Arsenide (AlInAs), Indium Gallium Phosphide (InGaP), Indium Gallium Arsenide (InGaAs), Indium Arsenide Antimonide (InAsSb), Indium Phosphide Antimonide (InPSb), Indium Arsenide Phosphide Antimonide (InAsPSb), and Gallium Indium Arsenide Antimonide Phosphide (GaInAsSbP).

The discrete optical unit 243 can be a component that is separately formed from the supporting layer 242 and layers 210, but can subsequently attached to a cavity 221 of the support layer 242 and/or layers 210. The discrete optical unit 243 can include any type of material, such as silicon or glass, suitable for forming mirror(s) 209, optic(s) 291, or both. In some instances, the mirror 209 may redirect incident light to a top surface, such as the optics 291.

The discrete optical unit 243 can be located in a cavity 221 formed in the supporting layer 242 and/or layers 210. The discrete optical unit 243 can be configured to receive light 241 and can redirect it towards the system interface 280. In some examples, the discrete optical unit 243 can further include an anti-reflection coating 244 located on at least one facet, such as its receiving facet 245.

The mirror(s) 209 can be configured to redirect light. In some examples, the mirror(s) 209 can act as an outcoupler(s) configured to receive light from one plane (e.g., the plane located parallel to that of layers 210) and redirect it to another plane (i.e., out of plane) (e.g., the plane located perpendicular to that of layers 210). The mirror(s) 209 can be angled relative to the facet wall 222 of the cavity 221 and/or a receiving facet 245 of the discrete optical unit 243. The receiving facet 245 can include an edge of the discrete optical unit 243 configured to receive light 241. The angle of the mirror(s) 209 can be any angle including, but not limited to, 45° and 54.7°. In some examples, the receiving surface (i.e., the surface where light 241 is incident on) of the mirror 209 can be configured with a profile shape that both turns and collimates (e.g., curved surface) light 241.

In some examples, at least a part of a side of the discrete optical unit 243 acts as the mirror 209. The mirror may be formed such that light reflects at the interface of the discrete optical unit 243 and the gap 216 (or any material filling the space where the gap 216 is labeled in the figure). The mirror 209 may be formed in the gap 216; for example, the mirror 209 may be formed at a surface of the discrete optical unit 243. In such instances, the metal layer 208 may be excluded from the device 200.

In other instances, one or more layers may be deposited on a side (e.g., surface) of the discrete optical unit 243, where the one or more layers can act as the mirror 209. For example, the one or more layers may include one or more metal layers 208. The light may be redirected at an interface of the side of the discrete optical unit 243 and a surface of the one or more metal layers 208.

In some examples, the one or more layers may form the mirror(s) 209 and can be made of the same material as the discrete optical unit 243. The mirror may be such that light reflects at the interface of the one or more layers and the gap 216 (or any material filling the space where the gap 216 is labeled in the figure).

In some examples, the discrete optical unit 243 can have certain dimensions (e.g., height and width as measured by the beginning and end of its angled wall) based on factors from other components. In some instances, the height of the mirror 209 can be configured such that a substantial part (e.g., all) of the beam from light 241 is incident on the angled wall of the mirror 209. For example, the height of the mirror 209 can be based on the distance between where light 241 enters the cavity 221 (e.g., at the facet wall 222 of the cavity) and where light 241 is incident on the mirror 209. In some instances, the location of where light 241 is incident on the mirror 209 can be determined based on the average of all locations of where light 241 is incident on the mirror 209. For example, the distance from the facet wall 222 to the mirror 209 can be less for light 241 that is incident closer to the bottom of the cavity 221 than for light 241 that is incident closer to optics 291. Since the distances from the facet wall 222 to the mirror 209 can vary, the average distance can be used to determine the height of the mirror 209. The height of the mirror 209 can also be based on the height of where light 241 exits the facet wall 222 of the cavity (i.e., the termination point in the waveguide) to the bottom of the mirror 209.

In some examples, the height of the mirror 209 can be based on the divergence angles of light 241. The divergence angles of light 241 may be affected by the material (if any) included between the facet wall 222 of the cavity 221 and the discrete optical unit 243. For example, light 241 may have a greater divergence angle when only air is located between the facet wall 222 of the cavity 221 and the discrete optical unit 243 compared to other materials, such as a fill material (e.g., amorphous silicon).

Optics 291 can be configured to redirect, collimate, and/or focus light towards the system interface 280. The optics 291 can receive light from the mirror 209. In some examples, the system interface 280 can be located between the measured sample volume (e.g., sample volume 120 illustrated in FIG. 1A) and the optics 291. In some examples, optics 291 can include the same material as the discrete optical unit 243. In some examples, the optics 291 can, at least in part, be formed from a portion of the discrete optical unit 243. The optics 291 can include an anti-reflection coating 245 disposed on its top surface (i.e., surface closer to the system interface 280).

In some examples, the dimensions and placement of the optics 291 can be based on one or more factors such as the beam size and divergence. For example, the optics 291 can be located a certain separation distance from the mirror 209. The separation distance can be selected such that light 241 can diverge by a certain amount (e.g., 10%) relative to mirror 209. The amount of divergence can affect the size of the beam at the optics 291. If the optics 291 is located too close to the mirror 209, then the beam size may be too small for the given application. In some instances, the separation distance can be determined using the average of the distances from the mirror 209.

In some examples, the top surface (e.g., closer to the system interface 280) of the discrete optical unit 243 can be located closer (i.e., protrude) to the system interface 280 than the top of layers 210. The protrusion can allow light 241 to diverge from the mirror 209 to the optics 291 with reduced loss, as discussed earlier. The protrusion can be achieved in a number of ways such as by configuring the dimension (e.g., height) of the discrete optical unit 243 to be greater than the recess of the cavity 221 and/or by using a pedestal (discussed below).

The device 200 can include one or more layers 210. The layers 210 can include one or more conductive layers configured to route one or more signals to a light emitter (e.g., light emitter 107 illustrated in FIG. 1A). For example, the layers 210 can be configured to route one or more signals from a controller (e.g., controller 140 illustrated in FIG. 1A) to control the light emitter, which can emit light in response to the one or more signals. The layers 210 can also include one or more insulating layers. For example, the layers 210 can include multiple conductive layers electrically isolated by the insulating layer(s). In some instances, the layers 210 can include one or more encapsulation layers, passivation layers, planarizing layers, or the like.

The layers 210 can also be used, at least in part, to form a waveguide for the light emitter. For example, the layer 210A can include $SiO_2$ and can be used for insulating and/or encapsulating metal routing layers. The layer 210B can be a silicon on insulator (SOI) layer, and the layer 210C can be a buried oxide (BOX) layer.

Figure 4A:
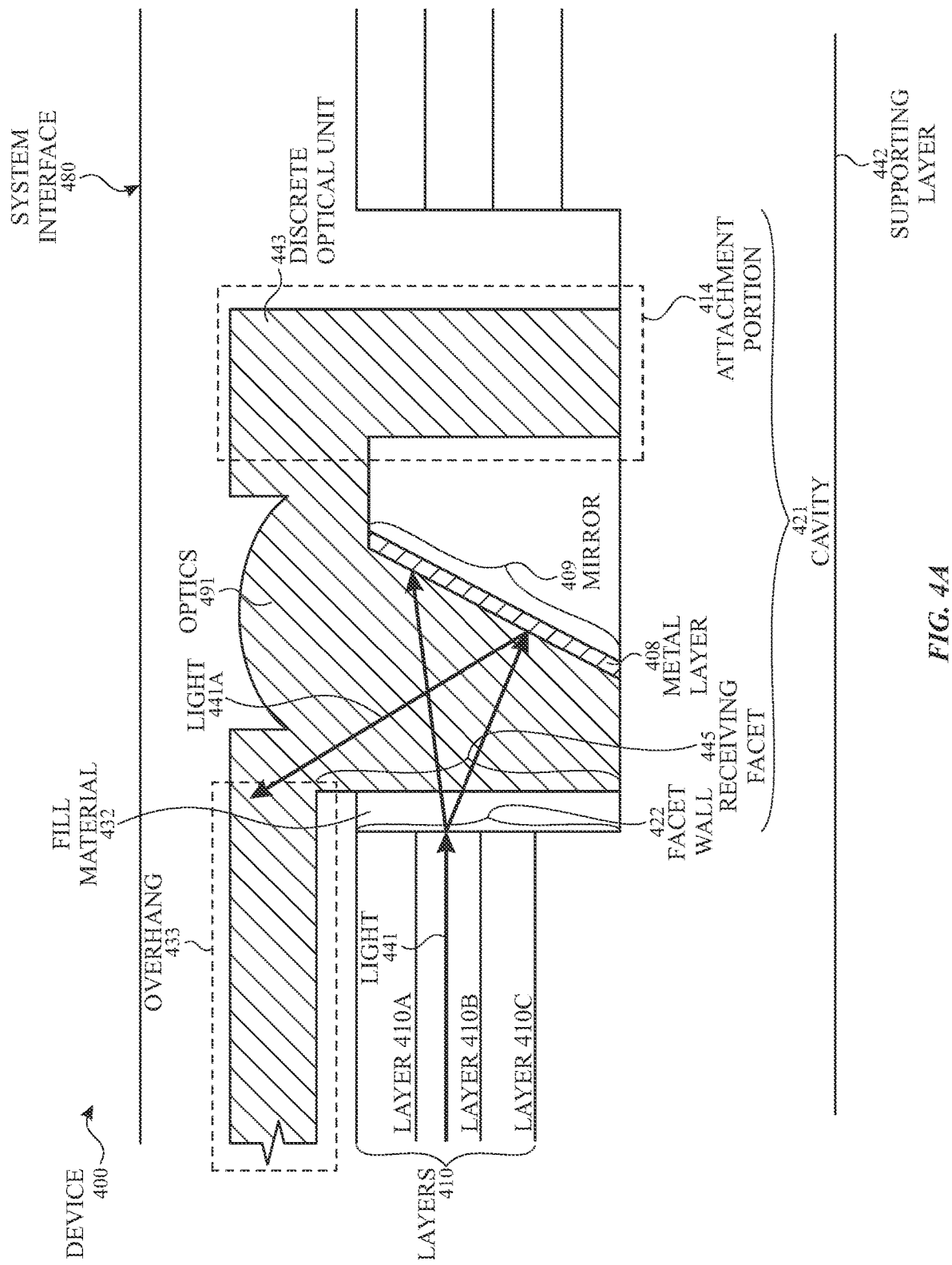
FIG. 4A illustrates a cross-sectional view of an exemplary portion of an integrated photonics device including a fill material according to examples of the disclosure.

The device 200 can also include one or more adhesive layers 212 used to bond the discrete optical unit 243 to the supporting layer 242 and/or layers 210. For example, the adhesive layer(s) 212 can be located between an attachment portion 214 of the discrete optical unit 243 and the supporting layer 242. Optionally, the adhesive layer(s) 212 can be located between an attachment portion 214 of the discrete optical unit 243 and the layers 210 (as illustrated in FIG. 4D). In such case, a gap (not shown) may be located between the discrete optical unit 243 and the bottom surface (e.g., perpendicular to the facet wall 222) of the cavity 221.

Figure 4B:
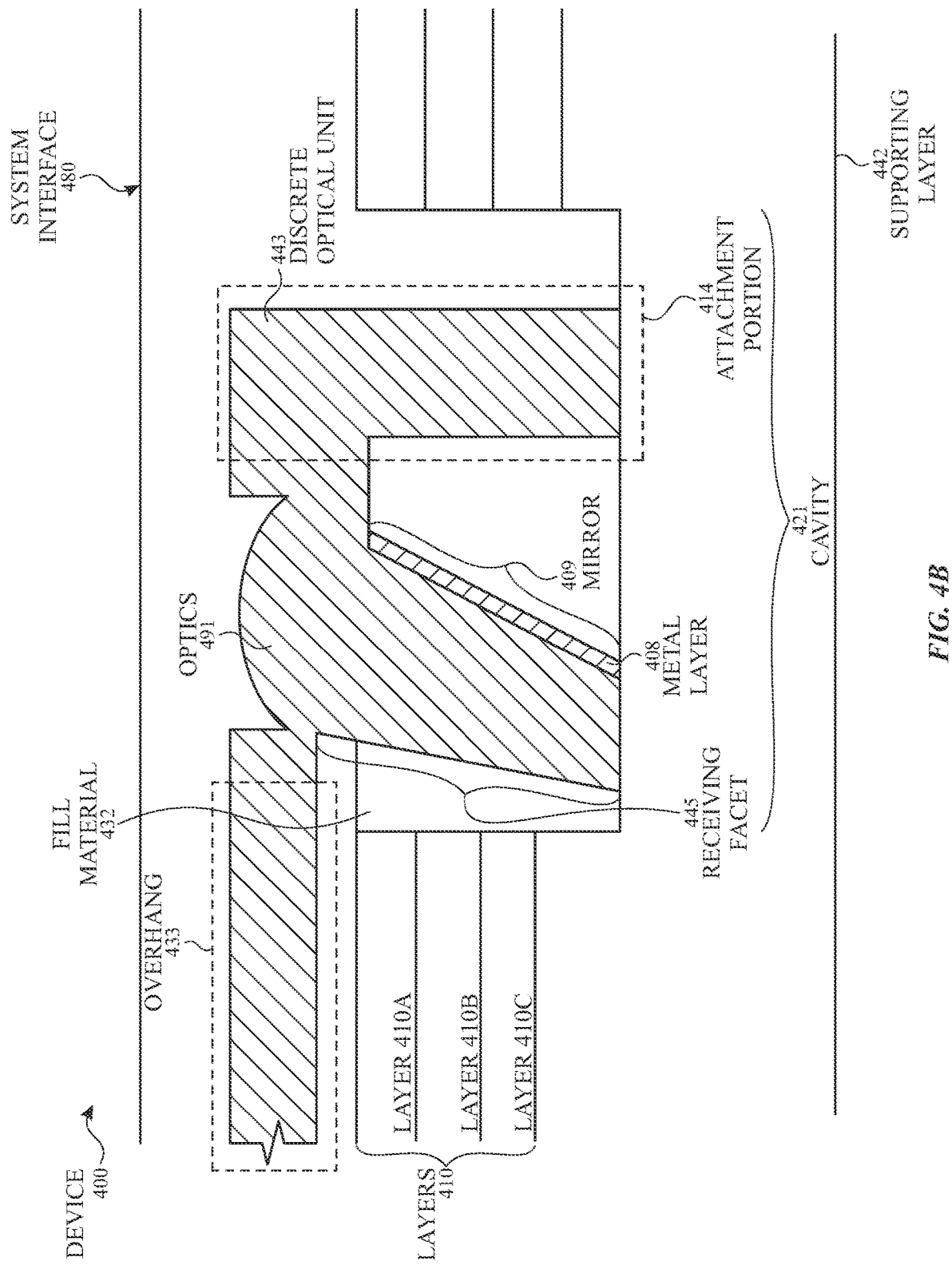
FIG. 4B illustrates a cross-sectional view of an exemplary portion of an integrated photonics device having a discrete optical unit with an angled receiving facet according to examples of the disclosure.
Figure 4C:
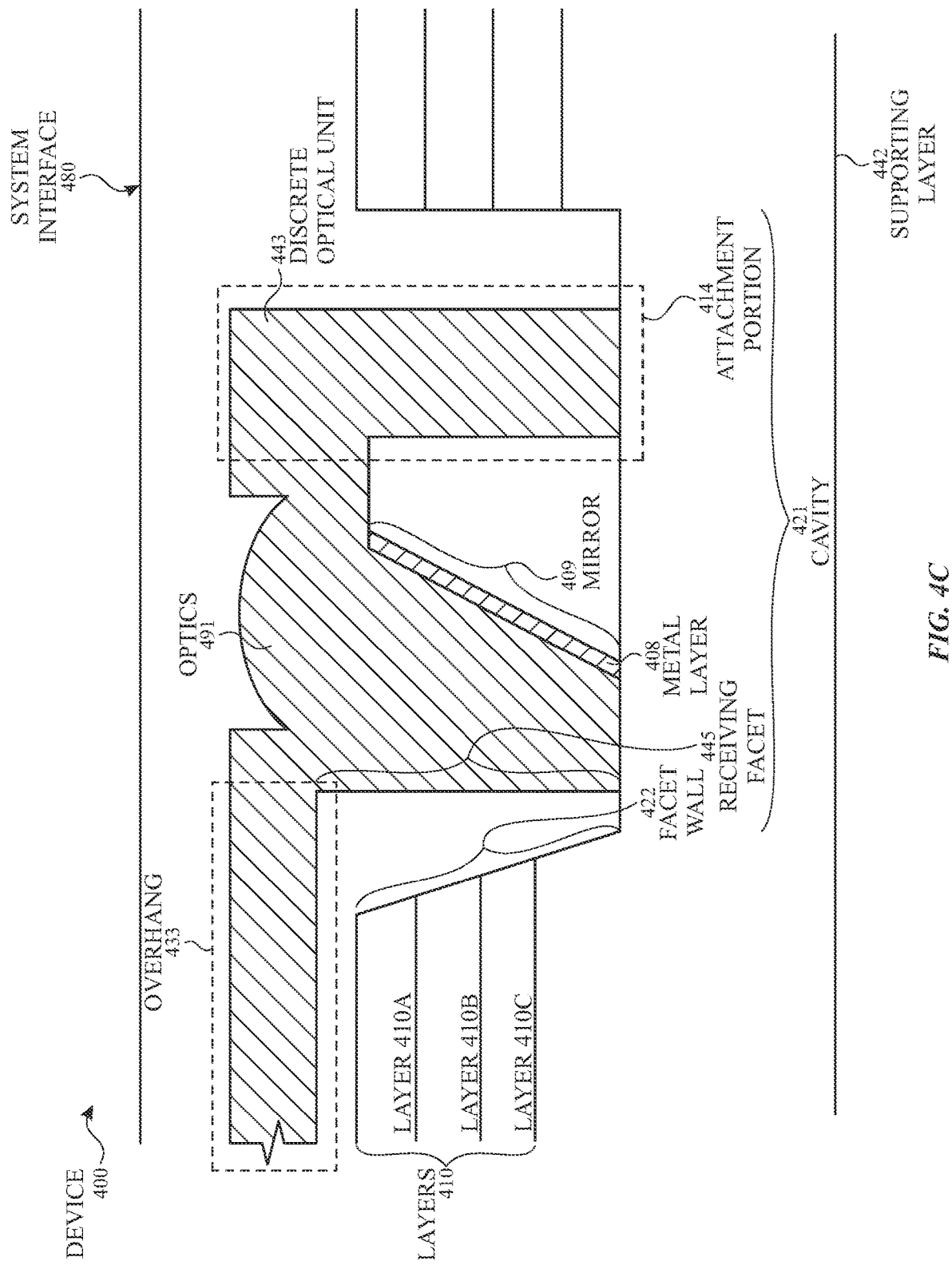
FIG. 4C illustrates a cross-sectional view of an exemplary portion of an integrated photonics device having a supporting layer with an angled facet wall according to examples of the disclosure.
Figure 4D:
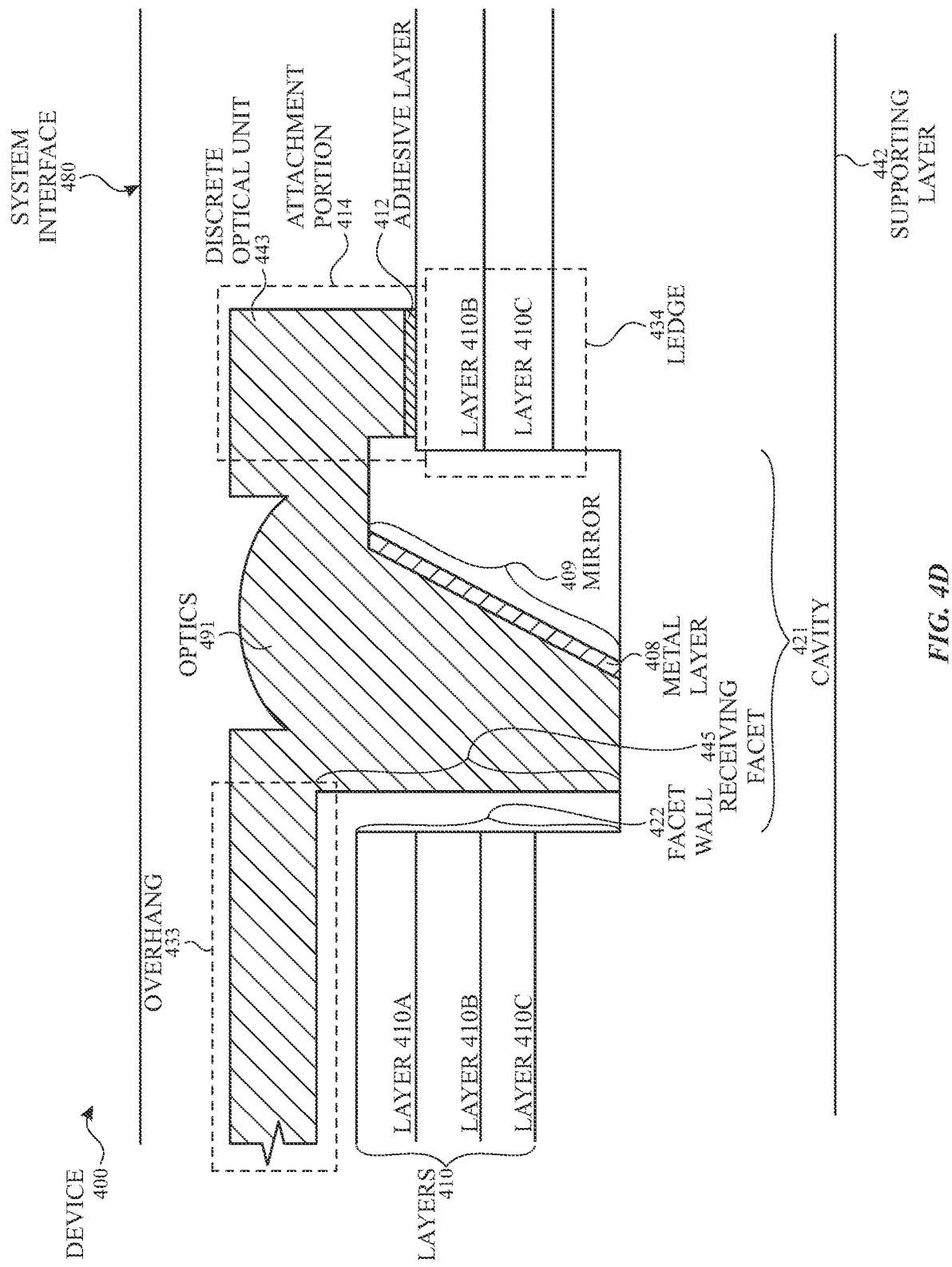
FIG. 4D illustrates a cross-sectional view of an exemplary portion of an integrated photonics device having a supporting layer with a ledge according to examples of the disclosure.
Figure 4E:
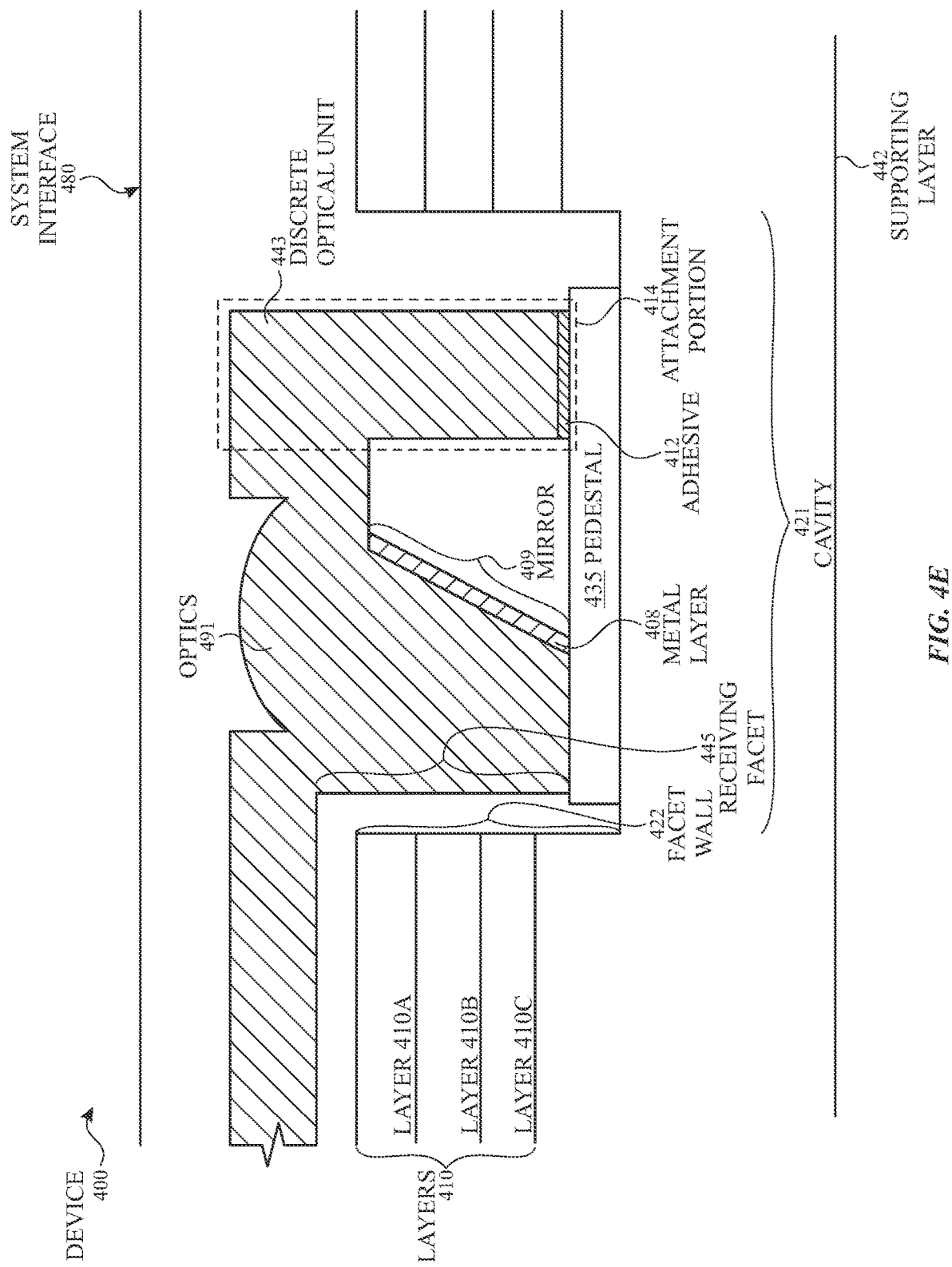
FIG. 4E illustrates a cross-sectional view of an exemplary portion of an integrated photonics device having a supporting layer with a pedestal according to examples of the disclosure.

As another option, the adhesive layer(s) 212 can be located between an attachment portion of the discrete optical unit 243 and a pedestal (as illustrated in FIG. 4E). The terms "adhesive" or "adhesive layer" as used throughout this disclosure can include various different types of materials for attaching multiple components. Exemplary materials include, but are not limited to, glue, epoxy, and solder. Additionally, the terms can include an interface between the surfaces of multiple components due to a direct bond. In a direct bond, the surfaces can attach to each other using one or more phenomenon such as chemical bonding, Van der Waals force, etc.

The discrete optical unit 243 can also include a gap 216 located between the metal layer 208 and the attachment portion 214. The gap 216 can include air or any material such as glue. As discussed below, although the discrete optical unit 243 is illustrated as including a single mirror 209, examples of the disclosure can include a discrete optical unit including multiple mirrors; some may be located in different cavities.

Examples of the disclosure can include a fill material located between the facet wall 222 (and/or anti-reflection coating 223) and the receiving facet 245 (and/or anti-reflection 244). The properties of the fill material are discussed in more detail below.

Operation of a Portion of an Exemplary Integrated Photonics Device

Figure 2B:
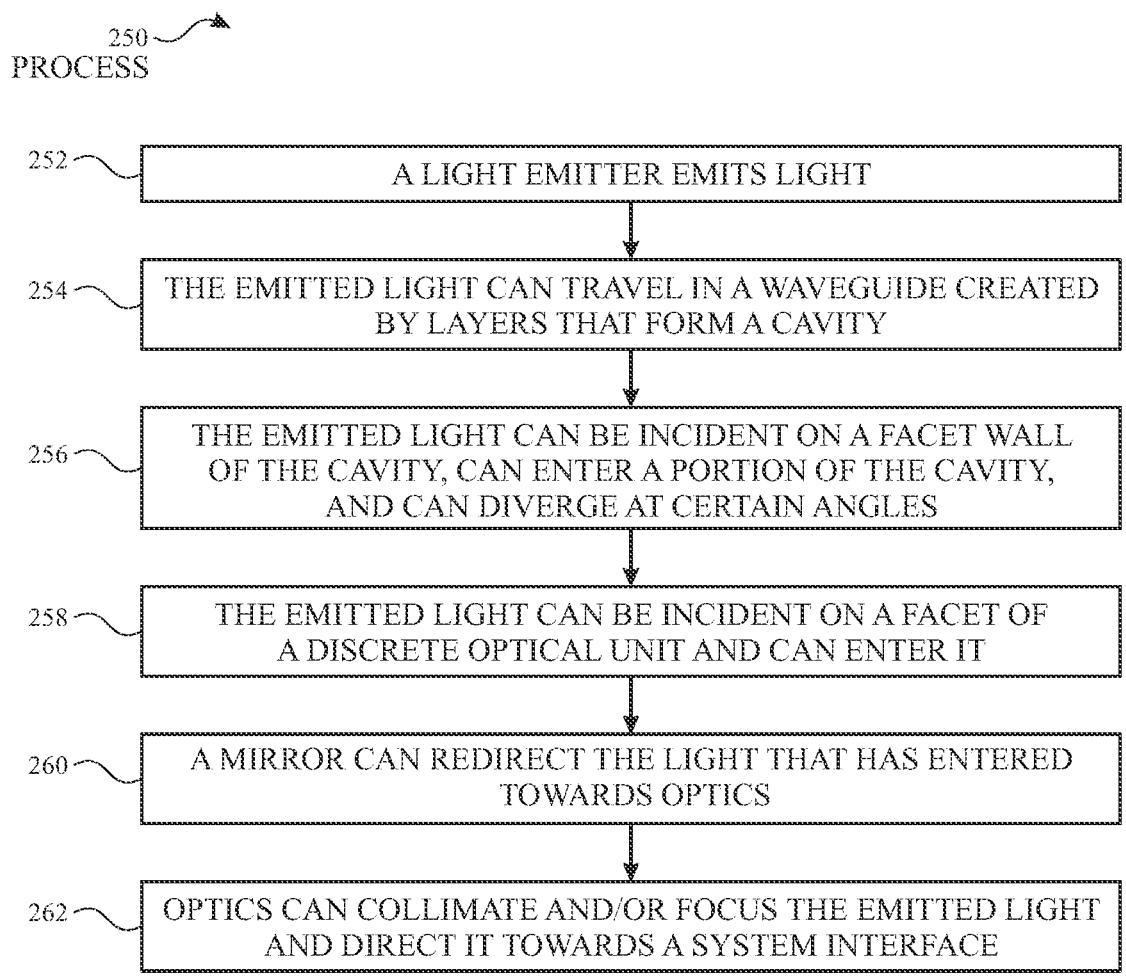
FIG. 2B illustrates an exemplary process for the operation of a portion of an integrated photonics device according to examples of the disclosure.

FIG. 2B illustrates an exemplary process showing the operation of a portion of an integrated photonics device according to examples of the disclosure. The integrated photonic device can be configured to emit light (e.g., towards a measured sample volume) out of its system interface (e.g., system interface 280 illustrated in FIG. 2A). A light emitter (e.g., light emitter 107 illustrated in FIG. 1A) can emit light (e.g., light 241 illustrated in FIG. 2A) (step 252 of process 250). The emitted light can propagate through a waveguide created by at least some of the layers (e.g., layers 210 illustrated in FIG. 2A) (step 254 of process 250). In some instances, some of the layers, at least in part, form a cavity. The emitted light can be incident on a facet wall (e.g., facet wall 222 illustrated in FIG. 2A) of a cavity, can enter (e.g., be received by) a portion of the cavity (e.g., cavity 221 illustrated in FIG. 2A), and can diverge at certain angle(s) (step 256 of process 250). The portion of the cavity that the emitted light enters can be the region located between the facet wall of the cavity and a facet of a discrete optical unit (e.g., discrete optical unit 243). In some examples, the divergence angle(s) of the emitted light can be changed by a fill material located between the facet wall and a discrete optical unit. The emitted light can be incident on a facet of the discrete optical unit and can enter (e.g., be received by) it (step 258 of process 250). A mirror (e.g., mirror 209 illustrated in FIG. 2A) can redirect the light that has entered the discrete optical unit to the optics (e.g., optics 291 illustrated in FIG. 2A) (step 260 of process 250). The optics can direct (e.g., collimate and/or focus) the redirected light towards a system interface (e.g., system interface 280 illustrated in FIG. 2A) (step 262 of process 250).

Overmold Layer

Figure 2C:
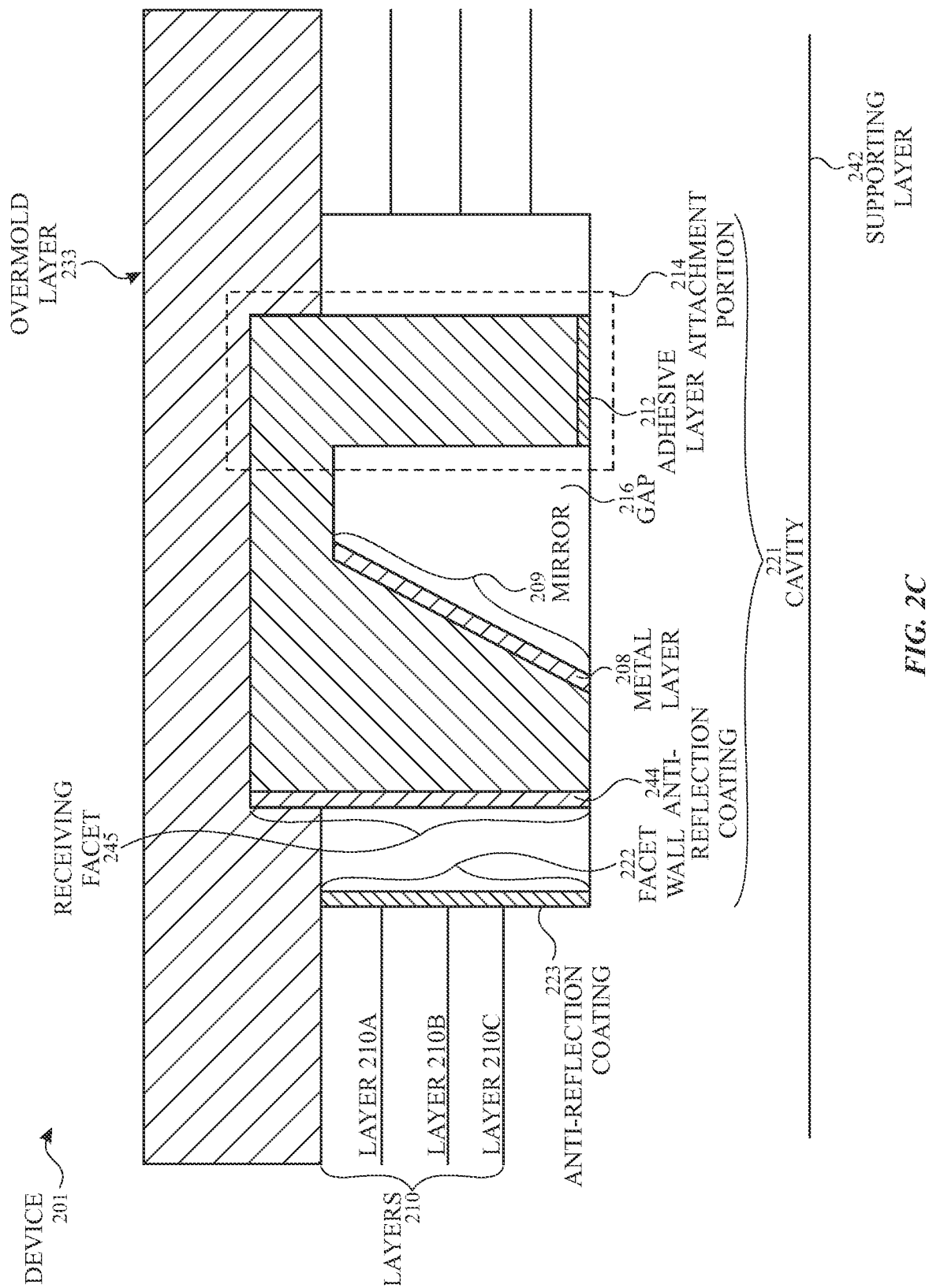
FIG. 2C illustrates a cross-sectional view of an exemplary portion of an integrated photonics device including an overmold layer according to examples of the disclosure.

In some examples, the integrated photonics device can include an overmold layer. FIG. 2C illustrates a cross-sectional view of an exemplary portion of an integrated photonics device including an overmold layer according to examples of the disclosure. Device 201 can have corresponding similar structure and/or function as device 200, including, but not limited to, components such as layers 210, anti-reflection coating 223, facet wall 222, anti-reflection coating 244, metal layer 208, mirror 209, gap 216, adhesive layer 212, attachment portion 214, cavity 221, and supporting layer 242 (discussed above).

The device 201 may further include a discrete optical unit 247, which can be similar to the discrete optical unit 243 of device 200 (illustrated in FIG. 2A). In some examples, the discrete optical unit 247 may not include optics 291. In some examples, the discrete optical unit 247 can have a height (e.g., distance from the bottom of cavity 221 to the top of the discrete optical unit 247) that less than the height of the discrete optical unit 243. The height of the discrete optical unit 247 may be such that the trop of the discrete optical unit 247 protrudes outside (e.g., above) the cavity 221.

The device 201 can further include an overmold layer 233. The overmold layer 233 can be located on top of layers 210. In some examples, the overmold 233 can be deposited after a portion of the top of discrete optical unit 247 has been removed via, e.g., grinding. In some examples, the overmold 233 can be deposited after the discrete optical unit 247 is bonded to the supporting layer 242 and/or layers 210. In some examples, a grinding step can be performed after the overmold layer 233 is deposited, which can lead to a reduced thickness of the overmold layer 233.

In some instances, the discrete optical unit 247 can be tested after the overmold layer is deposited. After the discrete optical unit 247 is tested, it can be removed (e.g., before or during the dies are diced. The discrete optical unit 247 may be removed if its performance does not meet one or more criteria. Alternatively, the discrete optical unit 247 can remain in the cavity after the dies are diced and used as an outcoupler. The discrete optical unit 247 can remain in the cavity if its performance meets one or more criteria.

Multiple Discrete Optical Units

Figure 3A:
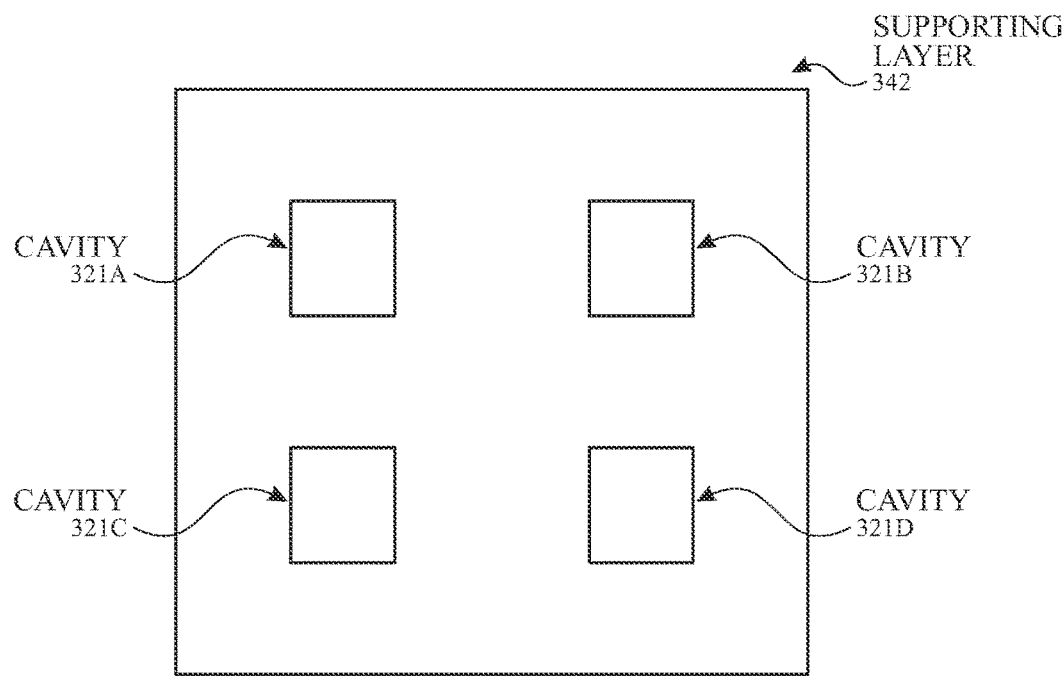
FIG. 3A illustrates a top view of a portion of an integrated photonics device including multiple cavities according to examples of the disclosure.

Examples of the disclosure can include multiple discrete optical units. FIG. 3A illustrates a top view of a portion of an integrated photonics device including multiple cavities according to examples of the disclosure. The supporting layer 342 can include a plurality of cavities, such as cavity 321A, cavity 321B, cavity 321C, and cavity 321D, some of which can be bonded to at least a portion of a discrete optical unit. In some examples, one or more cavities, such as cavity 321A, can be used as attachment region(s) but not for receiving light. An attachment region can be a region for attaching the discrete optical unit to the supporting layer 342.

Figure 3B:
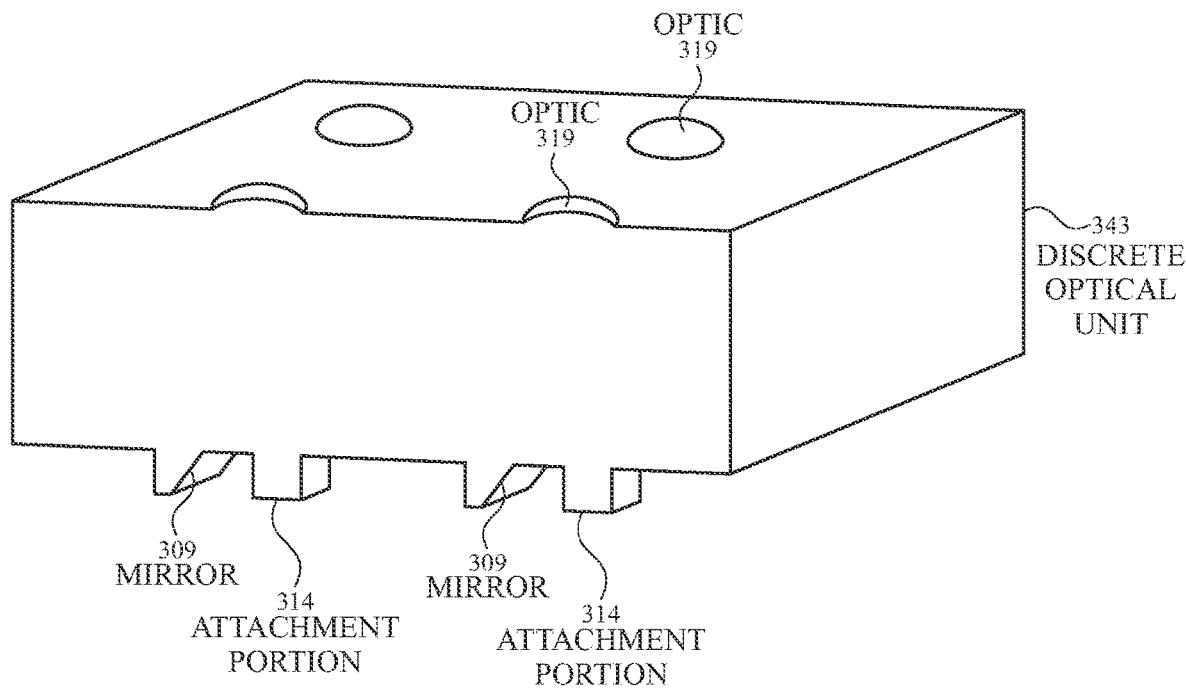
FIG. 3B illustrates a planar view of a portion of a discrete optical unit including multiple mirrors and attachment portions according to examples of the disclosure.

In some examples, the discrete optical unit can include multiple mirrors formed of the same substrate. FIG. 3B illustrates a planar view of a portion of a discrete optical unit including multiple mirrors and attachment portions according to examples of the disclosure. The discrete optical unit 343 can include a plurality of mirrors 309, a plurality of optics 391, and a plurality of attachment portions 314. In some examples, the discrete optical unit 343 can be formed from a silicon substrate. The discrete optical unit 343 can be bonded to the supporting layer at attachment portions 314 using an adhesive (including solder, direct bond, etc., as discussed above). When the discrete optical unit 343 is attached to the supporting layer (e.g., supporting layer 242 illustrated in FIG. 2A, supporting layer 342 illustrated in FIG. 3A), the attachment portions 314 can be located in one or more cavities of the supporting layer, outside of one or more cavities, or both. The optics 391 may also be located, at least in part, over (e.g., same line of sight) one or more cavities (e.g., cavity 221 illustrated in FIG. 2A, cavities 321 illustrated in FIG. 3A) of the supporting layer. In this manner, the discrete optical unit can provide a plurality of mirrors (e.g., outcouplers) for the device using a single substrate. Additionally, the plurality of outcouplers may be a two-dimensional array of outcouplers. In some examples, at least some of the plurality of outcouplers may be at locations inside from the edges of the device.

Figure 3C:
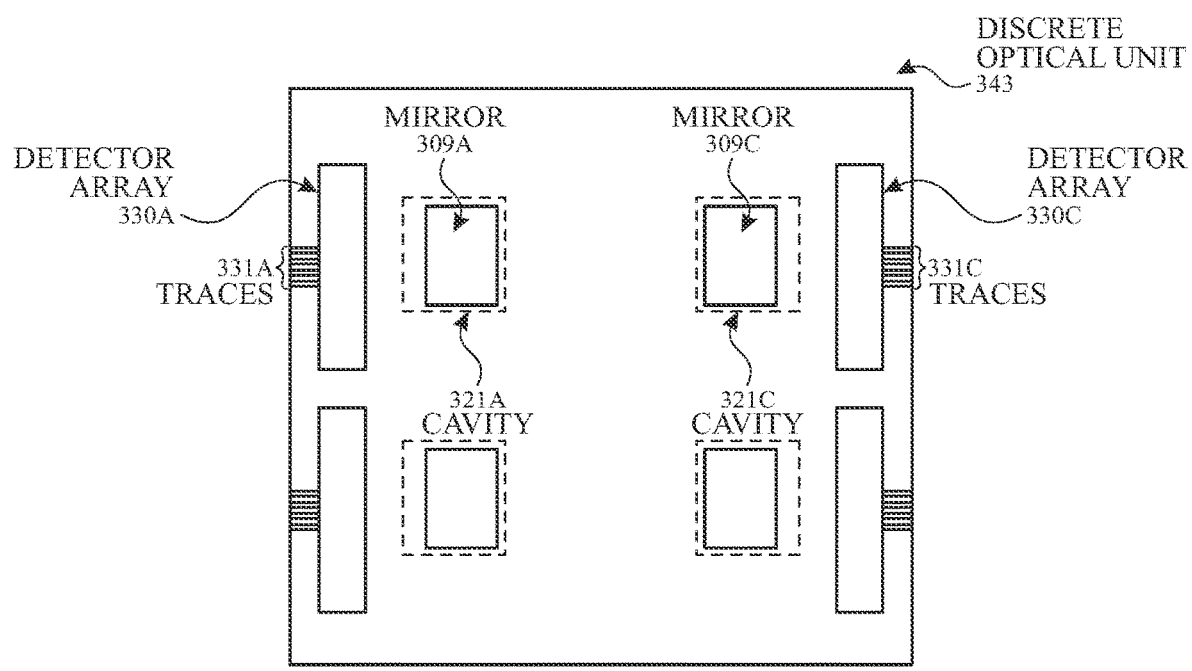
FIG. 3C illustrates a top view of an exemplary discrete optical unit including detector arrays according to examples of the disclosure.

Examples of the disclosure can also include other components, such as a plurality of detector arrays, included in the substrate that forms the discrete optical unit. FIG. 3C illustrates a top view of an exemplary discrete optical unit including detector arrays according to examples of the disclosure. The discrete optical unit 343 can include a plurality of detector arrays 330 formed and/or attached to the substrate. In some examples, the detector arrays 330 can be formed and/or attached before the discrete optical unit 343 is bonded to the supporting layer. In some examples, the substrate that forms the discrete optical unit 343 can include a plurality of metal traces (e.g., to route signals to the detector array). In this manner, a number of components can be included in the discrete optical unit: optics (e.g., on the other side of the discrete optical unit 343 from mirror 309), outcouplers, detectors, traces (e.g., traces 331), and the like.

In some instances, an outcoupler can be associated with one of the detector arrays. For example, the mirror 309A can be associated with the detector array 330A, cavity 321A, and corresponding traces 331A. Light redirected by mirror 309A to one region of the measured sample volume can return and be measured by the detector array 330A. Similarly, the mirror 309C can be associated with the detector array 330C, cavity 321C, and corresponding traces 331C. Light redirected by mirror 309C to another region of the measured sample volume can return and be measured by the detector array 330C. Traces 331A can transmit signals generated by detector 330A and indicative of the return light measured by the detector array 330A. Traces 331C can transmit signals generated by detector 330C and indicative of the return light measured by the detector array 330C. A controller (e.g., controller 140 illustrated in FIG. 1A) can receive signals transmitted by traces 331A and traces 331C to determine one or more properties of the measured sample volume.

The cavities 321, mirrors 309, attachment portions 314, optics 391, discrete optical unit 343, and/or supporting layer 342 can have one or more properties and/or functions similar to the cavity 221, mirror 209, attachment portion 214, optics 291, discrete optical unit 243, and supporting layer 242 discussed above in the context of FIG. 2A.

Discrete Optical Units

The integrated photonics device can also include a fill material. FIG. 4A illustrates a cross-sectional view of an exemplary portion of an integrated photonics device including a fill material according to examples of the disclosure. The fill material 432 can be deposited between the facet wall 422 of the cavity 421 and the receiving facet 445 of the discrete optical unit 443. Without the fill material, this region would comprise air (e.g., as shown in FIG. 2A). The interface between air and the facet wall of the cavity and between air and the receiving facet of the discrete optical unit can cause a potential etalon. In some examples, the fill material 432 can include the same materials and/or layer structure as layers 410. For example, the fill material 432 can be the same as layer 410A, layer 410B, and/or layer 410C. In some instances, the fill material 432 can include the same material as the supporting layer 442. In some examples, the fill material 432 can include amorphous silicon.

Figure 4F:
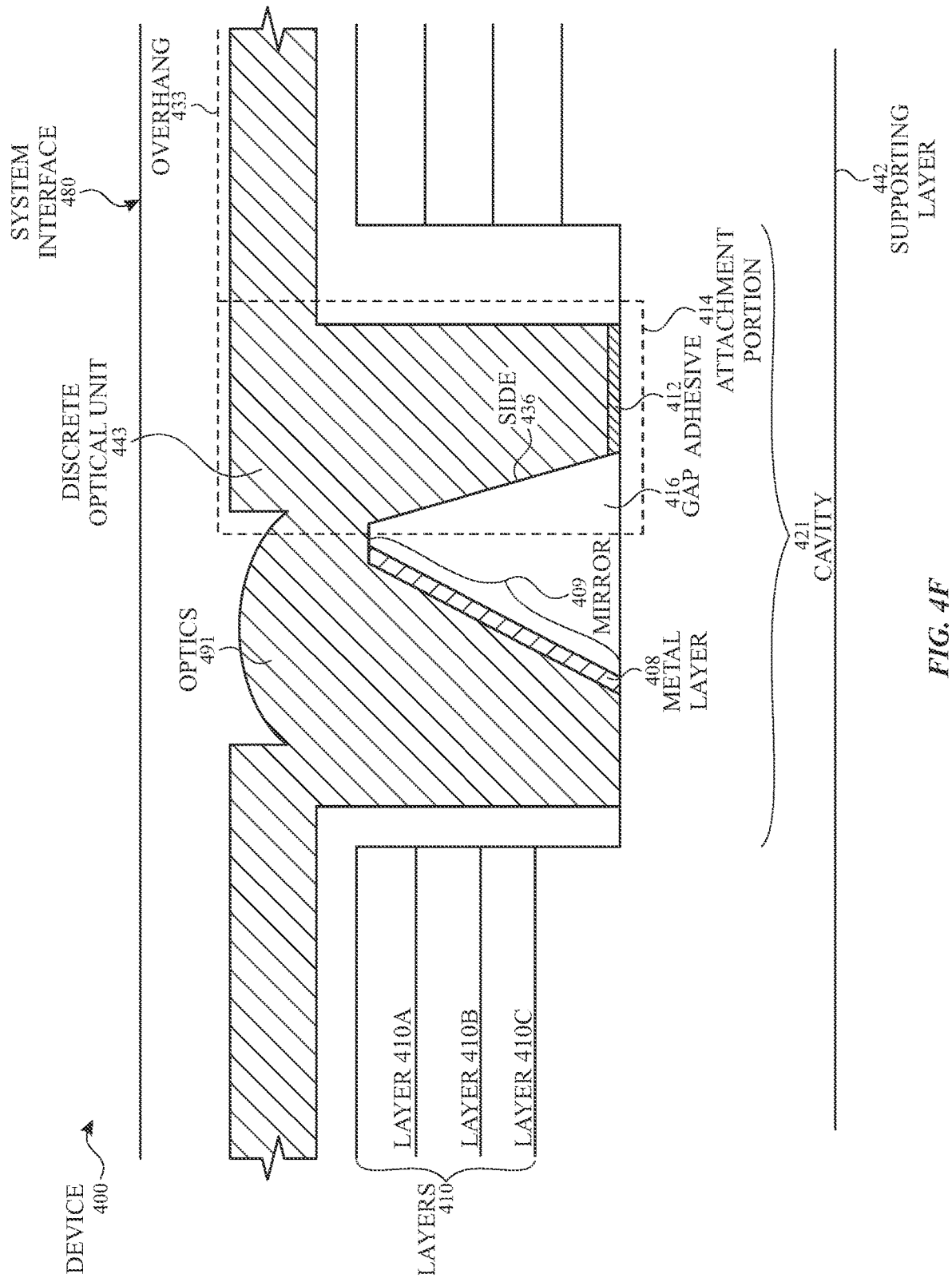
FIG. 4F illustrates a cross-sectional view of an exemplary portion of an integrated photonics device having a discrete optical unit with an attachment portion having an angled wall according to examples of the disclosure.

In some examples, the discrete optical unit 443 can include one or more overhangs 433. The figure illustrates an overhang 433 located to the left of optics 491. Examples of the disclosure can include an overhang located to the right of the attachment portion 414 (e.g., as shown in FIG. 4F). The overhang 433 can be a portion of the discrete optical unit 443 located proximate to optics 491. The overhang 433 can include the same materials as the mirror 409 and/or optics 491. The overhang 433 can be included to capture portions of light 441 that has reflected off mirror 409. For example, light 441A may be lost without the overhang 433. With the overhang 433, light 441A can be captured by other optics (not shown) and directed to the system interface 480. In some examples, an integrated photonics device that includes the overhang 433 may not include a fill material 432.

In some examples, the discrete optical unit 443 can have an angled receiving facet 445 (e.g., angled relative to the bottom of the cavity 421), as shown in FIG. 4B. The angled facet can facilitate the process of depositing the fill material 432. In some instances, the fill material 432 may also have an angled edge. Additionally or alternatively, as shown in FIG. 4C, the facet wall 422 can be angled.

In some instances, the device 400 can include one or more ledges 434, as shown in FIG. 4D. The ledge 434 can be used to attach the discrete optical unit 443 to the supporting layer 442, layers 410, or both. The discrete optical unit 443 can attach to the ledge 434 via the attachment portion 414 using adhesive layer 412. The ledge 434 can include any type of material such as those included in one or more of the layers 410. For example, as shown in the figure, in forming the ledge 434, the layer 410A may not be deposited or may be removed, while layer 410B and layer 410C can be deposited or not removed. In some examples, the cavity 421 may have a smaller width than if the device did not include a ledge (e.g., as shown in FIG. 4A). In some examples, the ledge 434 may be a separate component that attaches to both the cavity 421 and the discrete optical unit 443 (not shown).

The cavity may also include one or more pedestals, as shown in FIG. 4E. A pedestal 435 can be located at the bottom of the cavity 421. The discrete optical unit 443 can be bonded to the pedestal 435 via its attachment portion 414 using an adhesive 412. The pedestal 435 can be configured to provide the same location and/or plane for the bottom of the mirror 409. In this manner, the recess of the cavity 421 can be etched and any changes in the depth of the recess can be compensated for with the pedestal 435. In some examples, the height of the pedestal 435 can be based on the depth of the cavity 421.

FIG. 4F illustrates another example, where a side 436 of the attachment portion 414 can be angled wall relative to the bottom of the cavity 421. The angled side 436 can help attach the discrete optical unit 443 to the supporting layer 442. An adhesive 412 can be located between the angled side 436 and the supporting layer 442, as shown. In some examples, the gap 416, located between the mirror 409 and the attachment portion 414, can be filled at least partially with adhesive.

Figure 4G:
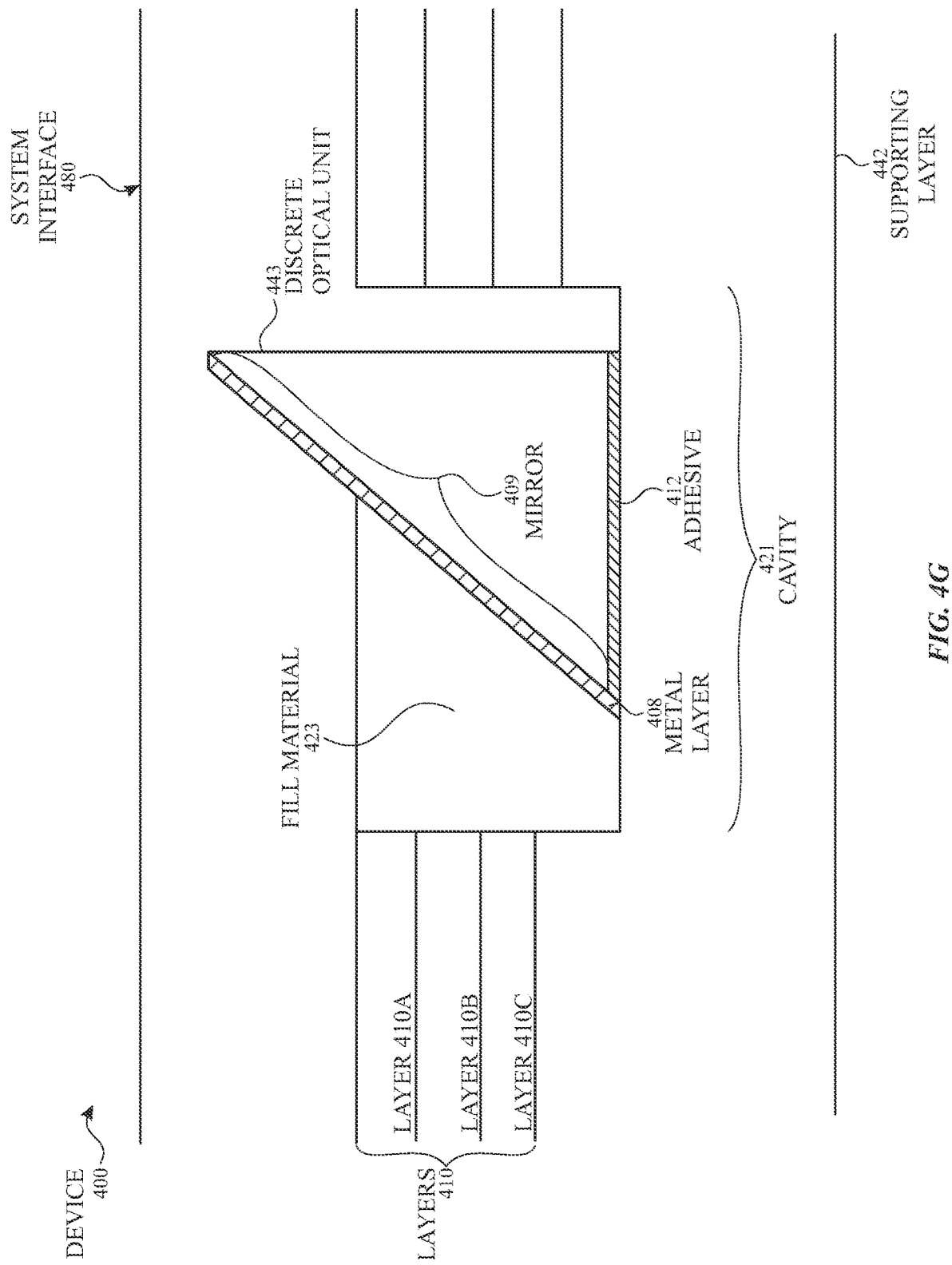
FIG. 4G illustrates an exemplary discrete optical unit that includes a prism according to examples of the disclosure.

In some examples, the discrete optical unit may be a prism. FIG. 4G illustrates an exemplary discrete optical unit that includes a prism according to examples of the disclosure. The discrete optical unit 443 can have at least one side that forms a mirror 409. The mirror 409 may, optionally, include a metal layer 408 deposited on the mirror 409. In this manner, the mirror 409 can be the receiving facet of the discrete optical unit 443. In some instances, the collimating optics can be located on a component (not shown) separate from the discrete optical unit 443.

The cavities 421, mirrors 409, attachment portions 414, optics 491, discrete optical unit 443, supporting layer 442, layers 410, facet wall 422, receiving facet 445, and/or adhesive 412 can have one or more properties and/or functions similar to the cavity 221, mirror 209, attachment portion 214, optics 291, discrete optical unit 243, supporting layer 242, layers 210, facet wall 222, receiving facet 245, and adhesive 212 discussed above in the context of FIG. 2A (and similarly, FIGS. 3A-3C). Additionally, the examples of the disclosure related to other components and features such as the anti-reflection coating 223, anti-reflection coating 244, anti-reflection coating 245, and gap 216 are applicable.

Fabrication of a Portion of an Exemplary Integrated Photonics Device

Figure 5A:
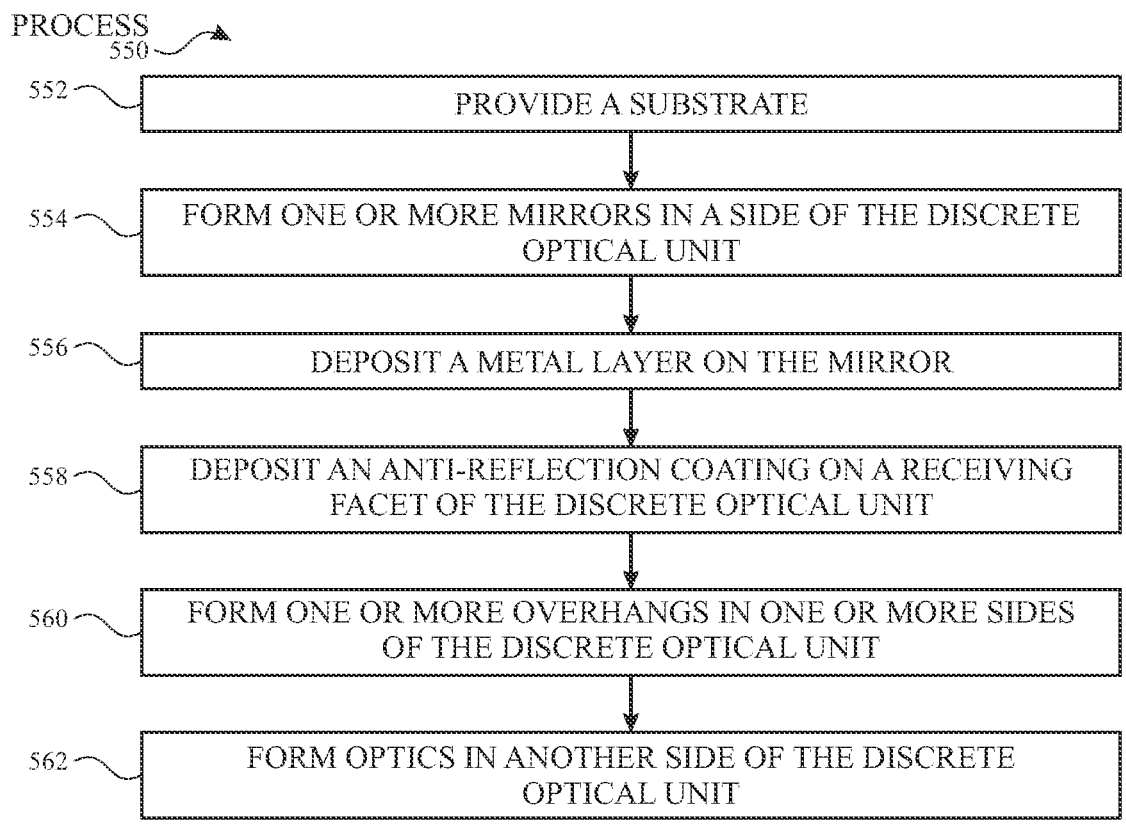
FIG. 5A illustrates an exemplary process for fabricating an exemplary discrete optical unit according to examples of the disclosure.

The discrete optical unit and the supporting layer can be formed in separate concurrent or serial processes. FIG. 5A illustrates an exemplary process for fabricating an exemplary discrete optical unit according to examples of the disclosure. The process can begin by forming the discrete optical unit (e.g., discrete optical unit 443 illustrated in FIGS. 4A-4G), which can include providing a substrate (step 552 of process 550). One or more mirrors (e.g., mirror 409 illustrated in FIGS. 4A-4G) can be formed in a side (e.g., bottom side that faces the cavities when the discrete optical unit is attached to the supporting layer) of the discrete optical unit (step 554 of process 550). In some examples, the discrete optical unit may include a prism, where the mirror can be a side of the prism (as shown in FIG. 4G). The mirror can be formed using any number of etching techniques such as gray scale etching, crystal plane etching, wet chemistry etching, and dry etching. Additionally, the mirror can be any angle (relative to a receiving facet of the discrete optical unit) including, but not limited to, 30°, 45°, 54.7°, 60°, etc. The angled wall of the mirror can be at any angle not coinciding with a crystallographic plane of the discrete optical unit. In some examples, a metal layer (e.g., metal layer 408 illustrated in FIGS. 4A-4G) may can be deposited on the mirror (step 556 of process 550). In some examples, another angled side of the discrete optical unit can be formed. For example, side 436 illustrated in FIG. 4F can be formed before, after, or at the same time mirror 409 is formed.

In some examples, a side of the discrete optical unit can be polished or etched to create an angled receiving facet (e.g., receiving facet 445 illustrated in FIG. 4B). In some examples, such as in devices where a fill material is not used, an anti-reflection coating (e.g., anti-reflection coating 244 illustrated in FIG. 2A) can be deposited on a receiving facet (e.g., receiving facet 445 illustrated in FIGS. 4A-4F) of the discrete optical unit (step 558 of process 550).

Optionally, one or more overhangs (e.g., overhang 433 illustrated in FIGS. 4A-4F) may be formed in one or more sides of the discrete optical unit (step 560 of process 550). In some examples, optics (e.g., optics 491 illustrated in FIGS. 4A-4F) can be formed in another side (e.g., top side), opposite the first side, of the discrete optical unit (step 562 of process 550). In some examples, the optics can be formed in another component, separate from the discrete optical unit.

Additionally, in some examples, one or more process steps can include forming or attaching detector arrays (e.g., detector arrays 330 illustrated in FIG. 3C), traces (e.g., traces 331 illustrated in FIG. 3C), and/or other components in the discrete optical unit.

Figure 5B:
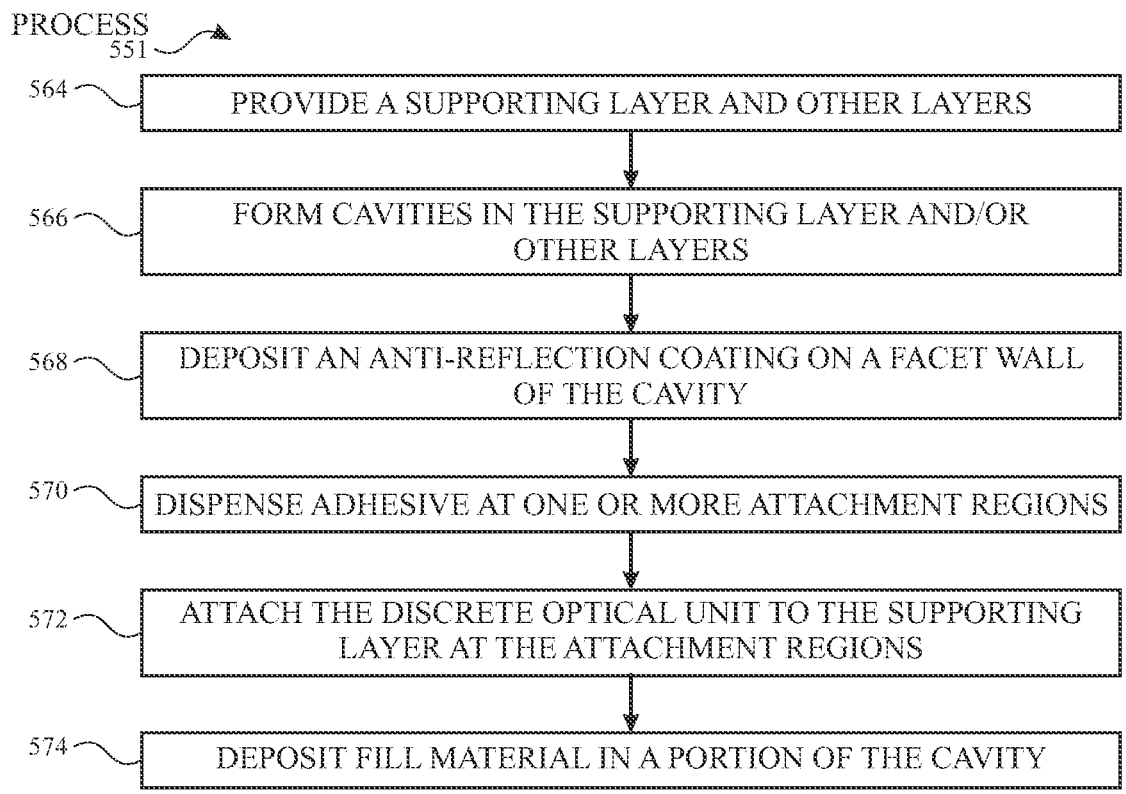
FIG. 5B illustrates an exemplary process for forming the supporting layer and attaching the discrete optical unit to the supporting layer according to examples of the disclosure.

FIG. 5B illustrates an exemplary process for forming the supporting layer and attaching the discrete optical unit to the supporting layer according to examples of the disclosure. A supporting layer (e.g., supporting layer 442 illustrated in FIGS. 4A-4G) and one or more (other) layers (e.g., layers 210 illustrated in FIG. 2A, layers 410 illustrated in FIGS. 4A-4G) can be provided (step 564 of process 551). One or more cavities (e.g., cavity 421 illustrated in FIGS. 4A-4G) can be formed in the supporting layer and/or the other layers (step 566 of process 551). The cavities can be formed using any type of etching technique such as dry etching or wet etching. In some instances, at least one wall of the cavity can be etched to form an angled wall (e.g., facet wall 422 illustrated in FIG. 4C). In some examples, the etching may be selective to form one or more ledges (e.g., ledge 434 illustrated in FIG. 4D).

In some examples, one or more components can be provided and attached to the cavity. For example, a ledge (e.g., ledge 434 illustrated in FIG. 4D) and/or a pedestal (e.g., pedestal 435 illustrated in FIG. 4E) can be formed or bonded to the bottom of the cavity (e.g., cavity 421 illustrated in FIGS. 4D-4E). In some examples, such as in devices where a fill material is not used, an anti-reflection coating (e.g., anti-reflection coating 223 illustrated in FIG. 2A) can be deposited on at least one wall (e.g., facet wall 422 illustrated in FIGS. 4A-4G) of the cavity (step 568 of process 551). A receiving facet of the discrete optical unit can be oriented towards a facet wall of a cavity.

Adhesive (e.g., adhesive 412 illustrated in FIGS. 4A-4G) may optionally be dispensed at one or more attachment regions (step 570 of process 551). The discrete optical unit(s) can be attached to the supporting layer at the attachment regions (step 572 of process 551).

In some examples, as discussed above in the context of FIG. 2C, the process 551 can include a step (not shown) of removing a portion of the discrete optical unit (e.g., discrete optical unit 247) to reduce its height. The process 551 may further include depositing an overmold layer (e.g., overmold layer 233 illustrated in FIG. 2C) after the discrete optical unit (e.g., discrete optical unit 247 illustrated in FIG. 2C) is attached in step 572, and testing the discrete optical unit 247. Additionally, the process 551 may include removing the discrete optical unit 247 (if, e.g., the discrete optical unit 247 does not meet one or more criteria) or may include keeping the discrete optical unit 247 attached (if, e.g., the discrete optical unit meets one or more criteria).

Optionally, a fill material (e.g., fill material 432 illustrated in FIGS. 4A-4B) can be deposited in a portion of the cavity (e.g., cavity 421 illustrated in FIGS. 4A-4G) of the supporting layer (step 574 of process 551). In some examples, such as when the discrete optical unit is integrated into the supporting layer and other layers (e.g., layers 210 illustrated in FIG. 2A, layers 410 illustrated in FIGS. 4A-4G), the top surface of the discrete optical unit is polished such that it can be flush with the other layers.

In some examples, the discrete optical unit can be bonded to the supporting layer by kinematic mounting. Negatively etched features can be formed in the bottom of the cavity, and protruding features can be formed in the discrete optical unit. The negatively etched features and protruding features can be kinematically mated. Additionally or alternatively, fiducials can be patterned on the discrete optical unit and the supporting layer for kinematic mounting. The fiducials can include features made from a metal layer or another material, for example.

In other examples, the discrete optical unit can be bonded to the supporting layer using an active alignment process. The process can use an adhesive (e.g., solder, glue, direct bond, etc.), as discussed above, and one or more waveguides. The one or more waveguides can propagate light to the discrete optical unit. The light can be imaged externally or can reflect back to the detectors, which can be mounted on top of the discrete optical unit, for example. Light can be emitted by one or more light sources and/or a fiber coupled to the waveguide. The active alignment process can be performed either before or after multiple dies are separated (e.g., diced).

In some examples, the collimating optics (e.g., optics 491 illustrated in FIGS. 4A-4F) can be formed in the discrete optical unit after bonding to the supporting layer. An anti-reflection coating (e.g., anti-reflection coating 245 illustrated in FIG. 2A) can be deposited on top of the collimating optics (e.g., optics 291 illustrated in FIG. 2A), whether the collimating optics is formed before or after the discrete optical unit is bonded to the supporting layer.

In instances where the discrete optical unit includes glass, a cure (e.g., ultraviolet cure) can be performed to set the adhesive (e.g., adhesive 412 illustrated in FIGS. 4A-4G) used to adhere the discrete optical unit to the supporting layer, other layers, or both. In some examples, the discrete optical unit and the supporting layer can be bonded using a direct bonding. The contacting surfaces of the discrete optical unit and the supporting layer can be polished. Alternatively, the process of etching the cavity can lead to a surface in the supporting layer suitable for direct bonding.

Multiple Waveguides and a Common Mirror

Figure 6A:
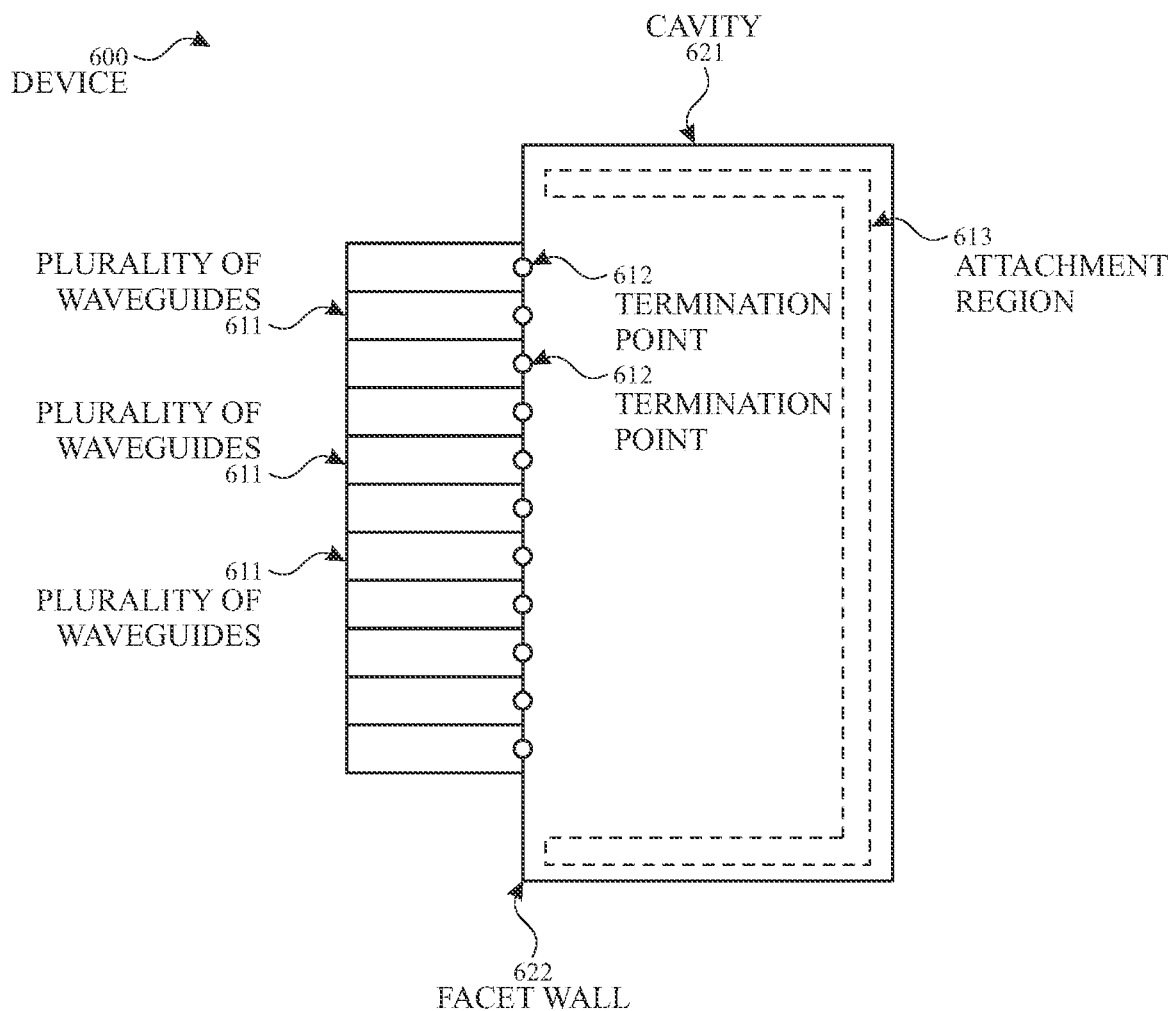
FIG. 6A illustrates a top view of an exemplary integrated photonics device including a plurality of waveguides and a common mirror according to examples of the disclosure.

Examples of the disclosure include an integrated photonics device having a plurality of waveguides. In some instances, the plurality of waveguides can share a common mirror. FIG. 6A illustrates a top view of an exemplary integrated photonics device including a plurality of waveguides and a common mirror according to examples of the disclosure. The device 600 can include a cavity 621 and a plurality of waveguides 611. The plurality of waveguides 611 can have termination points 612 located at the facet wall 622 of the cavity 621. The cavity 621 can include the attachment region 613, where the discrete optical units can be bonded to the supporting layer.

Figure 6B:
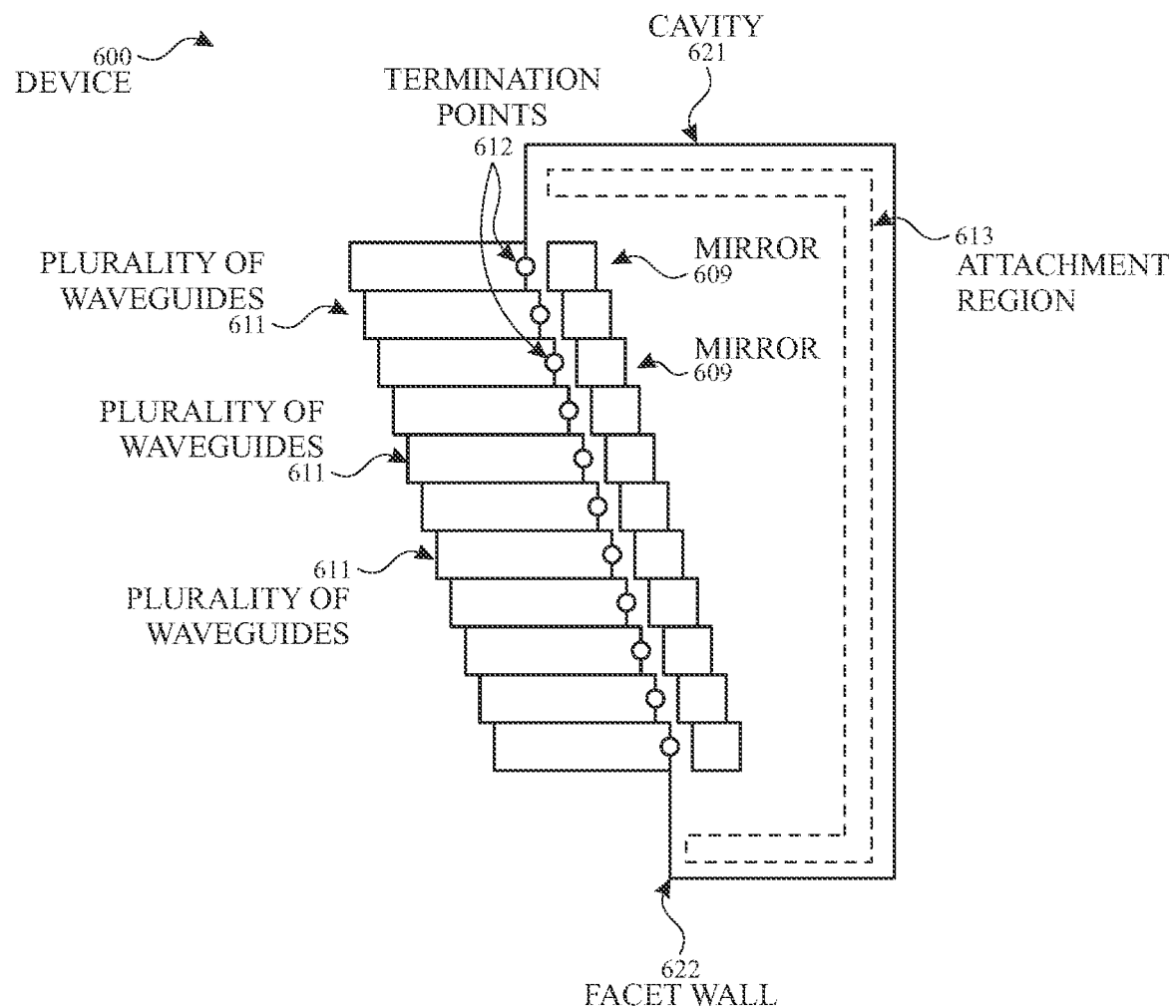
FIG. 6B illustrates a top view of an exemplary integrated photonics device including a plurality of waveguides and individual mirrors according to examples of the disclosure.

In some examples, the waveguides may be located in a staggered (e.g., staircase) arrangement, as shown in FIG. 6B. The plurality of waveguides 611, facet wall(s) 622 of the cavity 621, and the termination points 612 can be arranged in a staggered manner. The plurality of waveguides can be associated with a plurality of mirrors 609. In one example, the plurality of mirrors 609 can be separate and distinct discrete optical units, as shown in FIG. 6B.

Figure 6C:
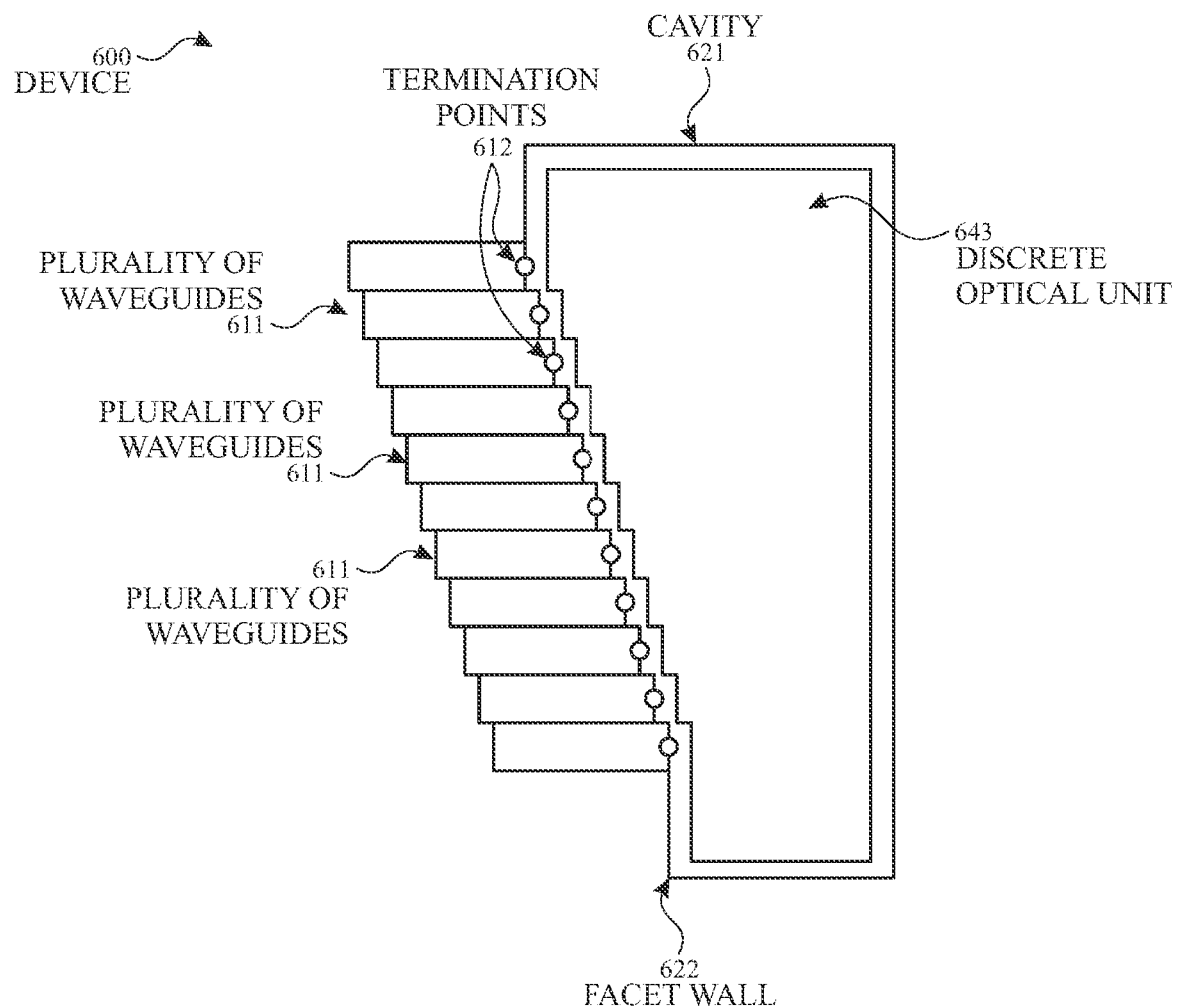
FIG. 6C illustrates a top view of an exemplary integrated photonics device including a plurality of waveguides and a plurality of mirrors formed on a single discrete optical unit according to examples of the disclosure.
Figure 6D:
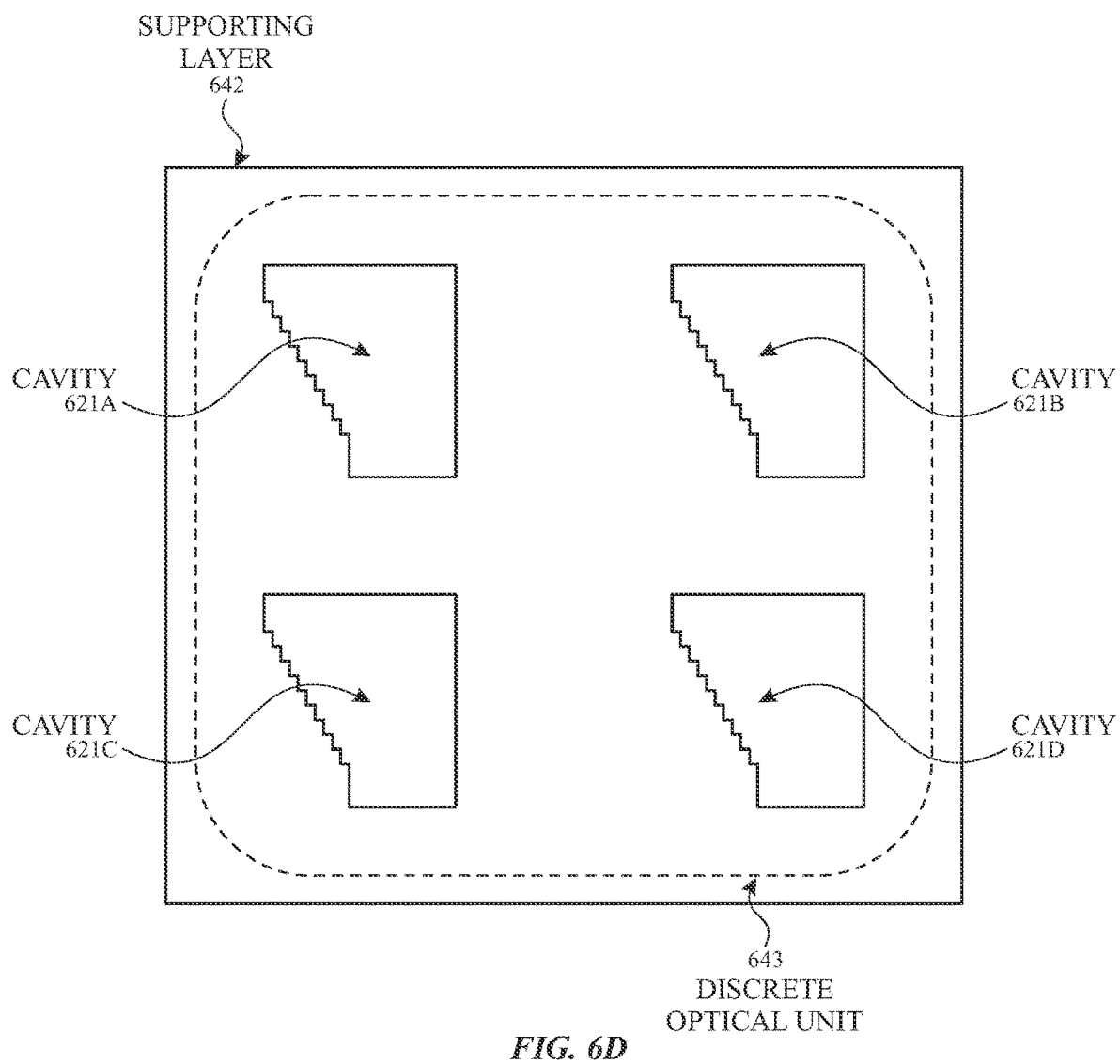
FIG. 6D illustrates a top view of an exemplary supporting layer including a plurality of cavities having staggered facet walls according to examples of the disclosure.

In another example, the plurality of mirrors 609 can be formed on a single discrete optical unit, as shown in FIG. 6C. The single discrete optical unit 643 having multiple mirrors arranged in a staggered manner. The spacing between the termination points 612 of the plurality of waveguides 611 and the mirrors can be the same. FIG. 6D illustrates a top view of an exemplary supporting layer 642 including a plurality of cavities 621 having staggered facet walls according to examples of the disclosure. In some examples, the discrete optical unit 643 can be attached to the supporting layer 642 in one or more regions where the cavities 621 are not located.

In the above examples, the mirrors are not limited to having the same properties. Examples of the disclosure can include at least two mirrors having one or more of different angles, sizes, shapes, type of metal layer, and the like. Additionally, the locations of the mirrors are not limited to a one- or two-dimensional array of mirrors having equal spacing between mirrors. The mirrors can be placed anywhere along the device and in any manner.

An integrated photonics device is disclosed. The integrated photonics device can include: a supporting layer including one or more cavities, at least one cavity including a facet wall; one or more light emitters that emit light towards the facet wall; a plurality of layers disposed on the supporting layer, wherein at least some of the plurality of layers are configured as one or more waveguides for the one or more light emitters; a discrete optical unit including: a substrate; one or more receiving facets that receive the emitted light, wherein the one or more receiving facets are formed from one or more sides of the substrate; one or more mirrors that redirect the emitted light received by the one or more receiving facets, wherein the one or more mirrors are formed from one or more sides of the substrate; and one or more attachment portions that bond the discrete optical unit to the supporting layer, wherein the one or more attachment portions are formed from one or more sides of the substrate; and an adhesive layer that bonds the one or more attachment portions of the discrete optical unit to the supporting layer, at least one of the plurality of layers, or both. Additionally or alternatively, in some examples, the integrated photonics device further comprises one or more antireflection coatings, the one or more anti-reflection coatings disposed on one or more of the facet wall and the one or more receiving facets. Additionally or alternatively, in some examples, the discrete optical unit further comprises at least one optic that receives the redirected light. Additionally or alternatively, in some examples, the at least one optics includes a same material as the discrete optical unit. Additionally or alternatively, in some examples, at least one of the one or more mirrors is angled relative to the facet wall and the one or more receiving facets. Additionally or alternatively, in some examples, a bottom of at least one of the one or more mirrors is located closer to a bottom of the at least one cavity than the plurality of layers. Additionally or alternatively, in some examples, the integrated photonics device further comprises a fill material located between the facet wall and at least one of the one or more receiving facets. Additionally or alternatively, in some examples, the fill material includes a same material as at least one of the plurality of layers. Additionally or alternatively, in some examples, the integrated photonics device further comprises: a system interface, wherein the plurality of layers is located closer to the system interface than the supporting layer, and further wherein a top of the discrete optical unit is located closer to the system interface than a top of the plurality of layers. Additionally or alternatively, in some examples, the plurality of layers includes a silicon on insulator (SOI) layer and a buried oxide (BOX) layer. Additionally or alternatively, in some examples, at least one of the one or more cavities is configured to attach to at least a portion of the discrete optical unit and does not receive the emitted light. Additionally or alternatively, in some examples, the integrated photonics device further comprises one or more detector arrays attached to the substrate of the discrete optical unit. Additionally or alternatively, in some examples, the integrated photonics device further comprises a plurality of traces disposed on the substrate of the discrete optical unit. Additionally or alternatively, in some examples, termination points of the one or more waveguides are located in a same cavity, and one of the one or more mirrors is used to redirect the emitted light from the one or more waveguides. Additionally or alternatively, in some examples, at least two of the one or more mirrors have different angles.

A method for emitting light out of a device is disclosed. The method comprises: emitting light by a light emitter, the light emitter included in the device; propagating the emitted light through a waveguide formed by at least some of a plurality of layers, wherein the waveguide and the plurality of layers are included in the device; receiving the emitted light at a facet wall of a cavity, the cavity included in a supporting layer of the device; receiving the emitted light at a receiving facet of a discrete optical unit, the discrete optical unit bonded to the supporting layer; redirecting the emitted light using a mirror of the discrete optical unit towards an optic; and directing the redirected light using the optic to a system interface of the device. Additionally or alternatively, in some examples, the method further comprises: changing one or more angles of divergence of the emitted light at the facet wall of the cavity using a fill material.

A method for forming an integrated photonics device is disclosed. The method comprises: forming a discrete optical unit, wherein forming the discrete optical unit includes: providing a substrate; and forming one or more mirrors in one or more sides of the substrate; forming one or more cavities in a supporting layer, other layers, or both, wherein at least one of the one or more cavities include a facet wall; orienting a receiving facet of the discrete optical unit towards the facet wall of the at least one of the one or more cavities; and attaching the discrete optical unit to one or more of the supporting layer, the other layers, or both. Additionally or alternatively, in some examples, the method further comprises: depositing a fill material in the at least one of the one or more cavities between the receiving facet of the discrete optical unit and the facet wall of the at least one of the one or more cavities. Additionally or alternatively, in some examples, forming the discrete optical unit further comprises forming one or more overhangs in one or more sides of the substrate.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. An integrated photonics device including:
   a photonics substrate comprising:
      a supporting layer,
      a plurality of additional layers disposed on the supporting layer and configured to define a first waveguide, and
      a first cavity extending through the plurality of additional layers and defining a first facet wall in the plurality of additional layers,
      wherein the first waveguide intersects the first facet wall and is configured to guide first light from a light emitter, wherein the first light exits the first waveguide at the first facet wall; and
   a discrete optical unit positioned at least partially in the first cavity and connected to the photonics substrate, the discrete optical unit including:
      a first receiving facet formed from a first surface of the discrete optical unit,
      a first mirror formed at a second surface of the discrete optical unit, and
      at least one optic, the at least one optic formed in an exit surface of the discrete optical unit and configured to receive the redirected first light,
      wherein the first receiving facet is positioned to receive the first light that exits the first waveguide at the first facet wall, and the first mirror is positioned to redirect the first light received by the first receiving facet.

2. The integrated photonics device of claim 1, further comprising:
   one or more metal layers located at the second surface of the discrete optical unit, wherein the first light is redirected at an interface at the second surface of the discrete optical unit and a surface of the one or more metal layers.

3. The integrated photonics device of claim 1, further comprising an antireflection coating, the anti-reflection coating disposed on the first facet wall and the first receiving facet.

4. The integrated photonics device of claim 1, wherein the discrete optical unit further comprises an overhang positioned above the plurality of additional layers.

5. The integrated photonics device of claim 1, wherein the first surface, the second surface, and the exit surface of the discrete optical unit are integrated surfaces that form at least a portion of the discrete optical unit.

6. The integrated photonics device of claim 1, wherein the first mirror is angled relative to the first facet wall and the first receiving facet.

7. The integrated photonics device of claim 1, wherein the first mirror extends into the first cavity past the plurality of additional layers.

8. The integrated photonics device of claim 1, further comprising a fill material located between the first facet wall and the first receiving facet.

9. The integrated photonics device of claim 8, wherein the fill material is made from the same material as at least one of the plurality of additional layers.

10. The integrated photonics device of claim 1, further comprising:
    a system interface, wherein the plurality of additional layers is located closer to the system interface than the supporting layer, and
    further wherein a top of the discrete optical unit is located closer to the system interface than a top of the plurality of additional layers.

11. The integrated photonics device of claim 1, wherein the plurality of additional layers includes a silicon on insulator (SOI) layer and a buried oxide (BOX) layer.

12. The integrated photonics device of claim 1, wherein the discrete optical unit further includes an attachment surface that connects the discrete optical unit to the photonics substrate.

13. The integrated photonics device of claim 12, wherein the discrete optical unit further includes a second cavity, the second cavity extending through at least a portion of the attachment surface and defining the second surface of the discrete optical unit.

14. The integrated photonics device of claim 1, further comprising one or more detector arrays attached to a substrate of the discrete optical unit.

15. The integrated photonics device of claim 1, further comprising a plurality of traces disposed on a substrate of the discrete optical unit.

16. The integrated photonics device of claim 1, wherein the plurality of additional layers is further configured to define a second waveguide, the second waveguide configured to guide second light to the first cavity,
    wherein the first receiving facet is further positioned to receive the second light, and the first mirror is further position to redirect the second light received by the first receiving facet.

17. The integrated photonics device of claim 1, wherein the discrete optical unit further comprises:
    a second receiving facet formed from a third surface of the discrete optical unit, wherein the second receiving facet is offset from the first receiving facet, and
    a second mirror formed from a fourth surface of the discrete optical unit, wherein the second mirror is offset from the first mirror.

18. The integrated photonics device of claim 17, wherein the plurality of additional layers is further configured to define a second waveguide, the second waveguide configured to guide second light,
    wherein the second receiving facet is positioned to receive the second light that exits the second waveguide, and the second mirror is positioned to redirect the second light received by the second receiving facet.

19. A method for emitting light out of a device, the method comprising:
    emitting first light by a light emitter;
    guiding the emitted first light through a first waveguide, the first waveguide defined by a plurality of additional layers, the plurality of additional layers disposed on a supporting layer of a photonics substrate;
    allowing the guided first light to exit the first waveguide at a first facet wall, the first facet wall defined by a cavity extending through the plurality of additional layers;
    receiving the guided first light by a first receiving facet, the first receiving facet formed from a first surface of a discrete optical unit, the discrete optical unit positioned at least partially in the cavity and connected to the photonics substrate;
    redirecting the guided first light received by the first receiving facet using a first mirror, the first mirror formed from a second surface of the discrete optical unit; and
    directing the redirected first light using an optic, the optic formed in an exit surface of the discrete optical unit.

20. The method of claim 19, further comprising:
changing one or more angles of divergence of the emitted first light at the first facet wall of the cavity using a fill material.

21. The method of claim 19, further comprising:
guiding second light through a second waveguide, the second waveguide defined by the plurality of additional layers;
receiving the guided second light by the first receiving facet; and
redirecting the guided second light received by the first receiving facet using the first mirror.

22. The method of claim 19, further comprising:
guiding second light through a second waveguide, the second waveguide defined by the plurality of additional layers;
receiving the guided second light by a second receiving facet, the second receiving facet formed from a third surface of the discrete optical unit; and
redirecting the guided second light received by the second receiving facet using a second mirror, the second mirror formed from a fourth surface of the discrete optical unit.

* * * * *